(12) United States Patent
Maehata et al.

(10) Patent No.: US 8,787,495 B2
(45) Date of Patent: Jul. 22, 2014

(54) SIGNAL PROCESSING CIRCUIT AND COMMUNICATION DEVICE HAVING THE SAME

(75) Inventors: Takashi Maehata, Osaka (JP); Mikhail Illarionov, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 34 days.

(21) Appl. No.: 13/581,221

(22) PCT Filed: Nov. 19, 2010

(86) PCT No.: PCT/JP2010/070699
§ 371 (c)(1),
(2), (4) Date: Aug. 24, 2012

(87) PCT Pub. No.: WO2011/104955
PCT Pub. Date: Sep. 1, 2011

(65) Prior Publication Data
US 2012/0321014 A1    Dec. 20, 2012

(30) Foreign Application Priority Data
Feb. 24, 2010    (JP) .................................. 2010-038714

(51) Int. Cl.
*H04K 1/02*    (2006.01)
(52) U.S. Cl.
USPC ...................................................... 375/297
(58) Field of Classification Search
USPC .............................................. 375/260, 296
See application file for complete search history.

(56) References Cited

U.S. PATENT DOCUMENTS

| | | | |
|---|---|---|---|
| 6,519,244 B1 | 2/2003 | Unno et al. | |
| 7,466,966 B2 | 12/2008 | Dartois | |
| 2002/0142739 A1* | 10/2002 | Smith | 455/103 |
| 2004/0109511 A1* | 6/2004 | Lee | 375/296 |
| 2006/0140296 A1* | 6/2006 | Cleveland et al. | 375/260 |
| 2008/0200126 A1* | 8/2008 | Okada et al. | 455/46 |

FOREIGN PATENT DOCUMENTS

| | | |
|---|---|---|
| JP | 2000-106548 A | 4/2000 |
| JP | 2002-353875 A | 12/2002 |
| JP | 2004-135087 A | 4/2004 |

(Continued)

OTHER PUBLICATIONS

International Search report dated Feb. 15, 2011 issued in corresponding International Application No. PCT/JP2010/070699.

*Primary Examiner* — Jaison Joseph
(74) *Attorney, Agent, or Firm* — McDermott Will & Emery LLP

(57) ABSTRACT

An object of the present invention is to appropriately limit an amplitude of an IQ baseband signal having different average powers for respective frequency bands B1 and B2, without degrading an SNR.

The present invention relates to a signal processing circuit 9 for reducing a PAPR of a modulated wave signal to be inputted to a power amplification circuit 5. The signal processing circuit 9 includes a power calculation section 13 that calculates an instantaneous power P of an IQ baseband signal of the modulated wave signal, and a signal processing section 17 that limits an amplitude of the IQ baseband signal by performing a clipping process or the like, by using cancellation signals Ic and Qc capable of canceling the IQ baseband signal in accordance with average powers of the respective frequency bands B1 and B2, such that an upper limit of an instantaneous power P becomes equivalent to a predetermined threshold Pth.

13 Claims, 15 Drawing Sheets

(56) References Cited

FOREIGN PATENT DOCUMENTS

| JP | 2005-020505 A | 1/2005 |
|----|---------------|--------|
| JP | 3853509 B | 9/2006 |
| JP | 2007-088711 A | 4/2007 |
| JP | 3954341 B | 5/2007 |
| JP | 2007-251341 A | 9/2007 |
| JP | 2008-199490 A | 8/2008 |
| WO | WO 2005/002009 A1 | 1/2005 |
| WO | WO-2007/037124 A1 | 4/2007 |
| WO | WO-2009/019892 A1 | 2/2009 |

* cited by examiner

FIG. 15
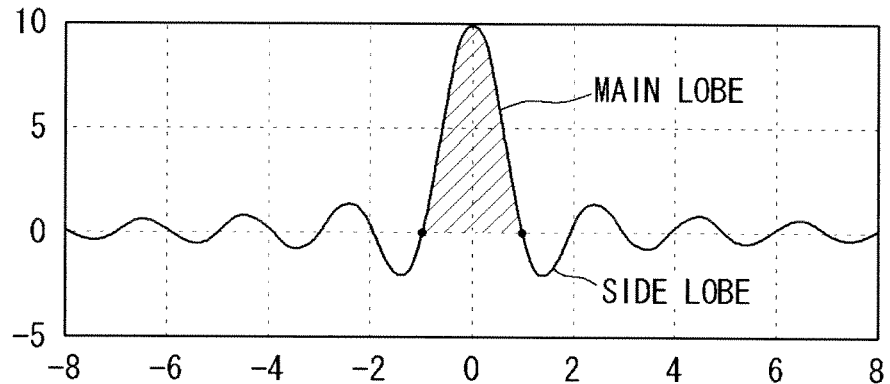
(A) SINC WAVEFORM
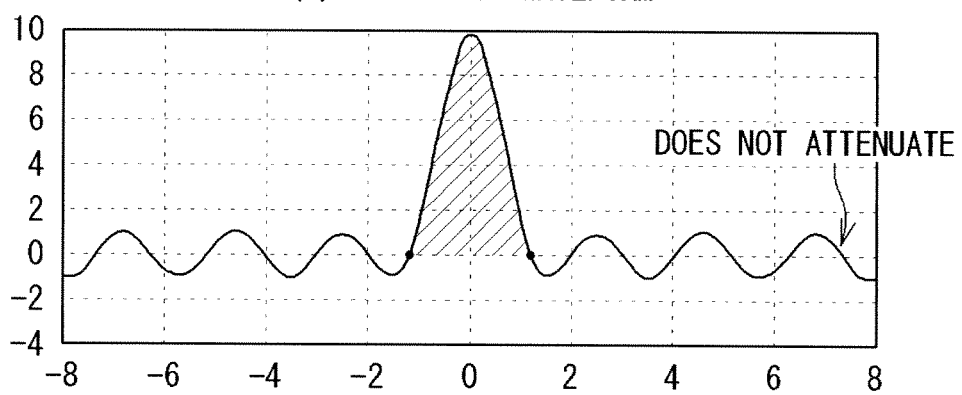
(B) CHEBYSHEV WAVEFORM
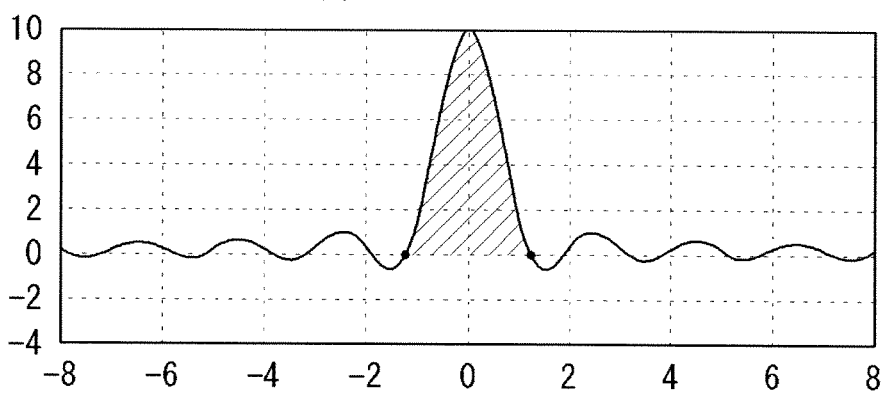
(C) TAYLOR WAVEFORM

US 8,787,495 B2

SIGNAL PROCESSING CIRCUIT AND COMMUNICATION DEVICE HAVING THE SAME

RELATED APPLICATIONS

This application is the U.S. National Phase under 35 U.S.C. §371 of International Application No. PCT/JP2010/0070699, filed on Nov. 19, 2010, which in turn claims the benefit of Japanese Application No. 2010-038714, filed on Feb. 24, 2010, the disclosures of which Applications are incorporated by reference herein.

TECHNICAL FIELD

The present invention relates to a signal processing circuit that limits an amplitude of an IQ baseband signal by means of a clipping process or the like, and to a communication device having this circuit. More specifically, the present invention relates to improvement of an amplitude limiting method for appropriately limiting an amplitude of an IQ baseband signal to be inputted to a power amplification circuit in a radio transmitter.

BACKGROUND ART

For example, in a method of modulating a transmission signal by using a plurality of carrier waves, such as OFDM (Orthogonal Frequency Division Multiplex) and W-CDMA (Wideband Code Division Multiple Access), there may be a case where phases of carrier waves overlap each other, thereby causing the transmission signal to have a large peak power.

On the other hand, although a superior linearity is required for a power amplifier, when a signal having a power exceeding a maximum output level is inputted, the output is saturated and nonlinear distortion increases.

Thus, when a signal having a large peak power is inputted in a nonlinear amplifier, nonlinear distortion occurs in an output signal, which causes degradation of reception characteristics on a receiver side and out-of-band radiation.

In order to prevent nonlinear distortion from increasing relative to a peak power, a power amplifier having a wide dynamic range is necessary. However, if the dynamic range of an amplifier is widened for a peak power that does not occur so often, the ratio of a peak power in a short time to an average power of a waveform on a time axis (PAPR: Peak to Average Power Ratio) increases, and thus, the power efficiency decreases.

Therefore, with respect to a signal having a large peak power that does not occur so often, it is more reasonable to suppress the peak power before the signal is inputted to the amplifier, than to directly input the signal to the amplifier. Thus, there exists a device that performs a clipping process that instantaneously applies, in order to suppress a peak power of an IQ baseband signal before its power is amplified, an amplitude in an inverse direction to the IQ baseband signal having a peak power exceeding a predetermined threshold.

Since such a clipping process is a process that applies an impulse-shaped signal in an inverse direction on the time axis, the clipping process is equivalent to applying a noise of a wide frequency band on the frequency axis. This cases a problem that a noise occurs outside the frequency band in a case where only a clipping process is simply performed.

Therefore, for coping with the problem of the out-of-band radiation, there are known peak power suppressing circuits referred to as NS-CFR (Noise Shaping-Crest Factor Reduction) and PC-CFR (Peak Cancellation-Crest Factor Reduction).

Of these, the NS-CFR circuit limits, with respect to a peak component (an increment from a threshold) of an IQ baseband signal having an instantaneous power exceeding the threshold, a frequency band by performing filtering with a low pass filter, a FIR (Finite Impulse Response) filter, or the like, and subtracts the peak component after the frequency band has been limited, from the original IQ baseband signal (see Patent Literature 1).

In the PC-CFR circuit, a cancellation pulse (basic function waveform) that prevents out-of-band radiation even when a clipping process is performed is set in advance, and a cancellation signal obtained by multiplying, by the cancellation pulse, a peak component (an increment from a threshold) of an IQ baseband signal having an instantaneous power exceeding the threshold, is subtracted from the original IQ baseband signal (see Patent Literatures 2 and 3).

CITATION LIST

Patent Literature

[PTL 1] U.S. Pat. No. 3,954,341
[PTL 2] U.S. Pat. No. 3,853,509
[PTL 3] Japanese Laid-open Patent Publication No. 2004-135087 (FIG. 1 to FIG. 6)

SUMMARY OF THE INVENTION

Problems to be Solved by the Invention

Meanwhile, for example, in the case of a base station that communicates with a large number of mobile phones, a transmission power may be set to a relatively high value for a frequency band to communicate a distant mobile phone, and to a relatively low value for another frequency band to communicate with a neighboring mobile phone, thereby changing a transmission power for each frequency band.

In this case, an average power of an IQ baseband signal inputted to a peak power suppressing circuit is also changed for each frequency band.

However, in the conventional peak power suppressing circuits described above, a cancellation signal is generated assuming that an average power of an IQ baseband signal is constant for all frequency bands, and a clipping process is performed by subtracting this cancellation signal from the original IQ baseband signal.

Therefore, with the conventional peak power suppressing circuits, with respect to a frequency band having a relatively low average power, an SNR (Signal to Noise Ratio) is lowered more than necessary due to the subtraction of the cancellation signal, which may cause communication to be disabled.

In view of the above problems, an object of the present invention is to provide a signal processing circuit and the like that can appropriately limit an amplitude of an IQ baseband signal without degrading an SNR, even when the IQ baseband signal has different average powers for different frequency bands.

Solution to the Problems (1) A signal processing circuit of the present invention is a signal processing circuit for reducing a PAPR of a modulated wave signal to be inputted to a power amplification circuit, the signal processing circuit including: a power calculation section that calculates an instantaneous power of an IQ baseband signal of the modulated wave signal; and a signal processing section that limits an amplitude of the IQ baseband signal by using a cancellation signal capable of cancelling the IQ baseband signal in accordance with average powers for respective frequency bands of the IQ baseband signal, so as to cause an upper limit or a lower limit, or both of the upper limit and the lower limit of the instantaneous power to be equivalent to a corresponding predetermined threshold(s).

According to the signal processing circuit of the present invention, the signal processing section limits an amplitude of an IQ baseband signal by using a cancellation signal capable of canceling the IQ baseband signal in accordance with average powers of respective frequency bands of the IQ baseband signal. Accordingly, it is possible to prevent powers in the respective frequency bands from fluctuating more than necessary due to the cancellation signal.

Accordingly, even in the case of an IQ baseband signal having different average powers for the respective frequency bands, it is possible to appropriately limit the amplitude without degrading an SNR.

(2) In the signal processing circuit of the present invention, the signal processing section may perform a clipping process that subtracts, from the original IQ baseband signal, the cancellation signal obtained by multiplying, by a predetermined cancellation pulse, an increment of the IQ baseband signal from a first threshold defining the upper limit of the instantaneous power, to suppress the instantaneous power of the IQ baseband signal to an instantaneous power equivalent to the first threshold.

(3) Further, in the signal processing circuit of the present invention, the signal processing section may perform a boosting process that adds, to the original IQ baseband signal, the cancellation signal obtained by multiplying, by a predetermined cancellation pulse, a decrement of the IQ baseband signal from a second threshold defining the lower limit of the instantaneous power, to raise a bottom level of the instantaneous power of the IQ baseband signal to an instantaneous power equivalent to the second threshold.

(4) Further, in the signal processing circuit of the present invention, the signal processing section may be capable of performing both of the clipping process and the boosting process.

(5) In a case where the cancellation signal, which is obtained by multiplying, by the cancellation pulse, an increment or a decrement from the threshold, is used, the signal processing circuit of the present invention needs to further include a pulse generation section that generates the cancellation pulse by multiplying basic pulses determined for the respective frequency bands by relative ratios of average powers for the frequency bands, respectively, and by summing obtained results.

(6) Specifically, the pulse generation section may include: a ratio calculation section that calculates the relative ratios for the respective frequency bands; a waveform storage section that stores the cancellation wave forms for the respective frequency bands; and a multiplication and addition section that multiplies, by the calculated relative ratios, the corresponding cancellation wave forms, respectively, and sums obtained results.

(7) In the signal processing circuit of the present invention, in a case where the signal processing section includes a pulse retention section that retains the cancellation pulse, it is preferable that only when the calculated relative ratios fluctuate, the multiplication and addition section performs multiplication and summation using the relative ratios after the fluctuation, and outputs a resultant cancellation pulse to the pulse retention section.

In this case, unless the relative ratios fluctuate, the multiplication and addition section does not perform multiplication and summation and the pulse retention section retains the existing cancellation pulse. Accordingly, compared with a case where the cancellation pulse is simply generated every time, arithmetic loads for the circuit can be reduced.

(8) A relative ratio of an average power of a frequency band can be calculated by: accumulating a square root of an instantaneous power of the frequency band for a predetermined sampling period, and by dividing the accumulated value by a sum of the accumulated values for respective frequency bands. However, in order to accurately perform in real time the calculation including such division, a large number of significant figures is needed, which results in a large scale circuit.

On the other hand, in digital signal processing, arithmetic processing is performed by using binary digits. Therefore, if the accumulated values are divided by an exponentiation of 2, only the position of the decimal point changes and the division need not be actually performed.

Therefore, in the signal processing circuit of the present invention, it is preferable that the ratio calculation section accumulates square roots of instantaneous powers for the frequency bands, respectively, and when a sum of the accumulated values has become an exponentiation of $2\pm\delta$ ($\delta$ is a sufficiently small predetermined value), the ratio calculation section calculates the relative ratios by dividing the corresponding accumulated values by the exponentiation of 2.

In this case, the relative ratio can be calculated by only changing the position of the decimal point of each accumulated value. Therefore, the relative ratios can be calculated accurately and fast without increasing the scale of the circuit.

(9) Further, in the signal processing circuit of the present invention, it is preferable that the ratio calculation section performs the calculation of the relative ratios, within a control period in which there is a possibility that an average power of the IQ baseband signal temporally fluctuates.

This is because, when the relative ratios are calculated within the control period, the relative ratios can be calculated in a stable condition where the average power of the IQ baseband signal does not fluctuate very much, and thus, accurate relative ratios can be obtained.

(10) Meanwhile, for example, in a case where a base station that communicates with a large number of mobile phones, a transmission power may greatly fluctuate in each time zone in accordance with the current communication traffic.

However, in a conventional peak power suppressing circuit, a threshold for detecting a peak of an instantaneous power of the IQ baseband signal is a fixed value. Therefore, the conventional peak power suppressing circuit only operates in a time zone where the transmission power is large, in accordance with maximum communication traffic. Thus, there is a case where the peak power suppressing circuit does not operate in a time zone where an average power of the IQ baseband signal is small, due to relatively small communication traffic, and thus, the power efficiency of the power amplifier cannot be improved.

Therefore, in the signal processing circuit of the present invention, it is preferable that a threshold updating section that updates the thresholds to be used in the signal processing section, for each control period in which there is a possibility that an average power of the IQ baseband signal temporally fluctuates.

In this case, since the threshold updating section updates the thresholds to be used in the signal processing section for each control period, an instantaneous power can be assuredly suppressed, for example, even in a time zone where an average power of the IQ baseband signal is relatively small.

More specifically, in a case where the signal processing circuit of the present invention is used in a transmitter employing the LTE (Long Term Evolution), a symbol period of the OFDM (Orthogonal Frequency Division Multiplex) may be employed as the control period. In a case where the signal processing circuit of the present invention is used in a transmitter employing W-CDMA (Wideband Code Division Multiple Access), a control period of a closed loop transmission power control may be employed as the control period.

This is because, in the LTE, the OFDM symbol period is a minimum time unit where a transmission power may greatly fluctuate, and in the W-CDMA, the control period of the closed loop transmission power control is a minimum time unit where a transmission power may greatly fluctuate.

(11) The communication device of the present invention includes a transmitter including the signal processing circuit of the present invention and the power amplification circuit arranged in a subsequent stage thereof, and has advantageous effects as those in the signal processing circuit of the present invention.

Advantageous Effects of the Invention

As described above, according to the present invention, an amplitude of an IQ baseband signal is limited by a cancellation signal capable of canceling in accordance with average powers of respective frequency bands of the IQ baseband signal, and thus, can appropriately limit the amplitude without degrading an SNR, even in the case of an IQ baseband signal having different average powers for respective frequency bands,

BRIEF DESCRIPTION OF THE DRAWINGS

FIG. 15 shows graphs showing variations of basic pulses in a time domain.

DESCRIPTION OF EMBODIMENTS

Hereinafter, embodiments of the present invention will be described with reference to the drawings.

First Embodiment

[Radio Communication System]

Figure 1:
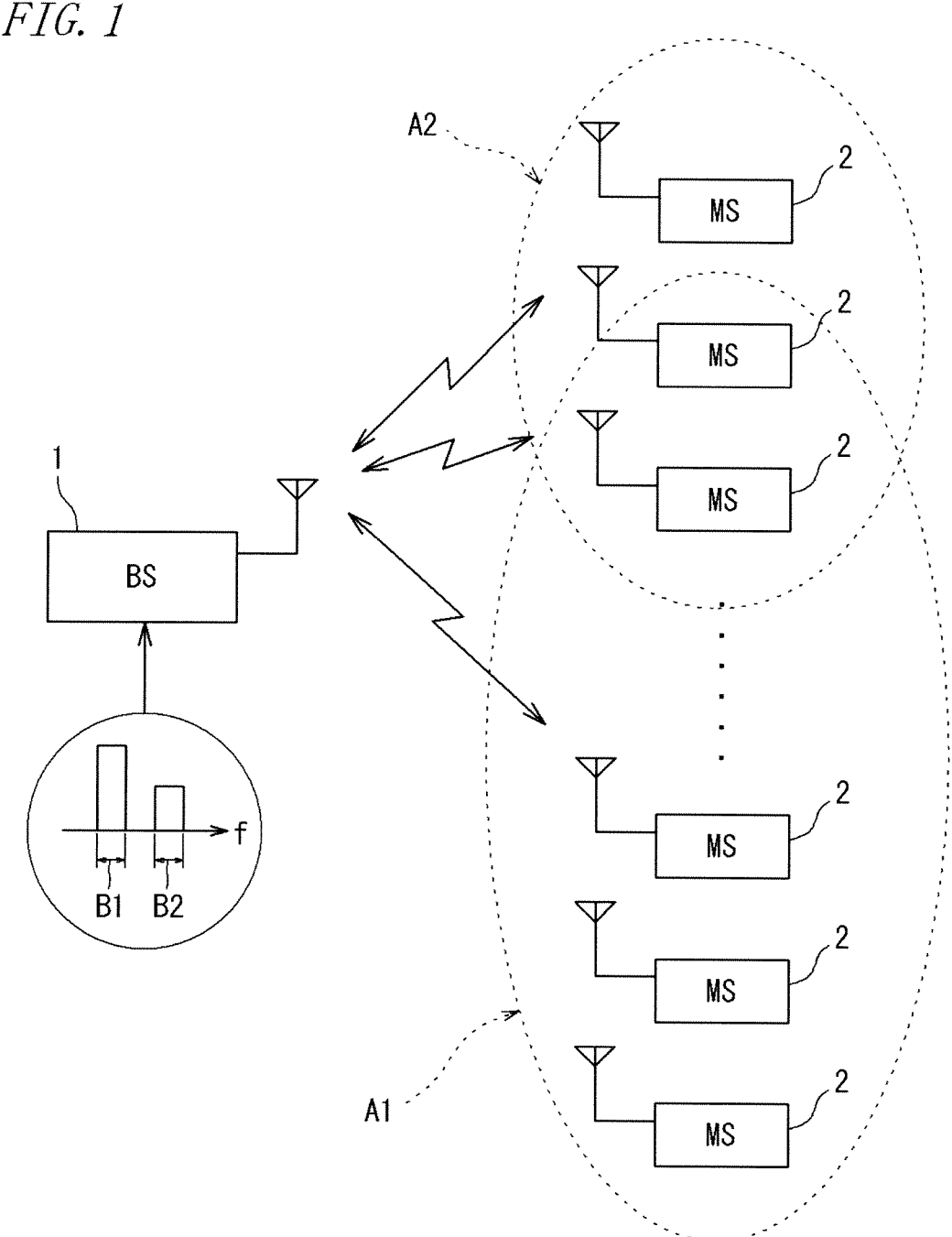
FIG. 1 shows an overall configuration of a radio communication system according to a first embodiment.

FIG. 1 shows an overall configuration of a radio communication system according to a first embodiment, to which system the present invention can be appropriately applied.

As shown in FIG. 1, a radio communication system of the present embodiment includes a base station (BS) 1, and a plurality of mobile terminals (MS) 2 that perform radio communication with the base station 1 in a cell of the base station 1.

In this radio communication system, OFDM is employed as a modulation method between the base station 1 and the mobile terminals 2. This method is a multi-carrier digital modulation method in which transmission data is carried by means of multiple carrier waves (subcarriers). Since the subcarriers are orthogonal to each other, this method has an advantage in that pieces of data can be densely arranged to an extent that they overlap each other along the frequency axis.

Further, the radio communication system of the present embodiment is a system for mobile phones to which LTE (Long Term Evolution) is applied, and communication complying with the LTE is performed between the base station 1 and each mobile terminal 2.

In the base station 1 based on the LTE, frequency bands for downlink frames can be set, for example, in units of 5 MHz, and in a case where downlink signals are transmitted to the mobile terminals 2 in the cell, the transmission power can be changed for each frequency band.

The example shown in FIG. 1 illustrates a case where the base station 1 transmits downlink frames in two frequency bands B1 and B2. A transmission power for a first frequency band B1 which is a lower frequency band is set to a greater value, and a transmission power for a second frequency band B2 which is a higher frequency band is set to a smaller value.

Therefore, as shown in broken lines in FIG. 1, a communication area A1 which the downlink signal of the first frequency band B1 having a greater transmission power reaches covers a farther and wider area than a communication area A2 which the downlink signal of the second frequency band B2 having a smaller transmission power reaches.

In an area where the communication area A1 and the communication area A2 overlaps each other, the mobile terminals 2 can perform communication both in the first and the second frequency bands B1 and B2, and thus, communication by the mobile terminals 2 can be assured even in the case of large communication traffic.

Note that the radio communication system to which the present invention is applicable is not limited to the LTE, and may be the W-CDMA. However, in the following, description will be given assuming that the present invention is applied to the base station 1 employing the LTE.

[LTE Downlink Frame]

Figure 7:
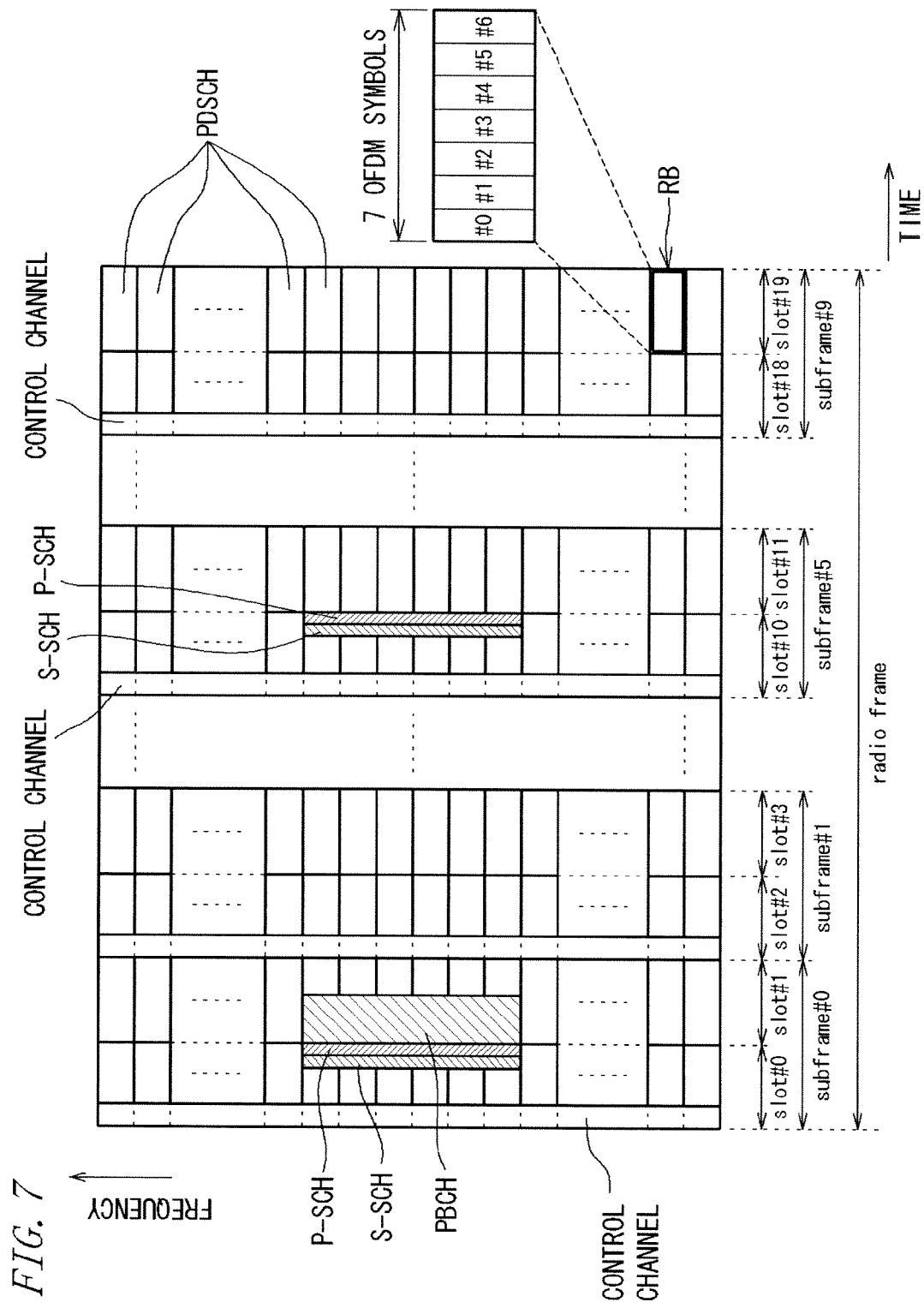
FIG. 7 is a diagram showing a configuration of an LTE downlink frame

FIG. 7 is a diagram showing a configuration of an LTE downlink frame. In FIG. 7, the vertical axis direction represents frequency, and the horizontal axis represents time.

As shown in FIG. 7, ten subframes in total (subframes #0 to #9) constitute a downlink (DL) frame. Each subframe consists of two slots (slot #0 and slot #1). Each slot consists of 7 OFDM symbols (in the case of Normal Cyclic Prefix).

With reference to FIG. 7, a resource block (RB) which is a basic unit for transmitting data is defined by 12 subcarriers in the frequency axis direction and 7 OFDM symbols (1 slot) in the time axis direction.

Therefore, for example, in a case where the frequency band width of a DL frame is set to 5 MHz, 300 subcarriers are arranged, and thus, 25 resource blocks are arranged in the frequency axis direction.

Note that a transmission time period for one subframe is 1 ms, and in the present embodiment, each of two slots constituting one subframe includes 7 OFDM symbols, and thus, a transmission period (symbol period) for one OFDM symbol is 1/14 ms (=about 0.071 ms).

As shown in FIG. 7, at the beginning of each subframe, a control channel is allocated which is used by the base station 1 in order to transmit, to a mobile terminal 2, information necessary for downlink communication.

DL control information, resource allocation information of the subframe, acknowledgement (ACK) and negative acknowledgement (NACK) in response to a hybrid automatic report request (HARM), and the like are stored in the control channel.

In a DL frame shown in FIG. 7, a PBCH is a physical broadcast channel for notifying terminal devices of bandwidth and the like of the system by means of broadcast transmission, and a primary synchronization channel (P-SCH) and a secondary synchronization channel (S-SCH), which are signals for identifying the base station 1 and a cell, are allocated to the 0th (#0) and the sixth (#5) subframes.

Resource blocks in other areas to which the above described channels are not allocated (unhatched area in FIG. 7) are used as physical downlink shared channels (PDSCH) for storing user data and the like.

The allocation of user data to be stored in the PDSCH is defined by the resource allocation information in the above-described control channel which is allocated at the beginning of each subframe. By using the resource allocation information, a mobile terminal 2 can determine whether data relating to itself is stored in the subframe.

[Configuration of a Transmitter]

Figure 2:
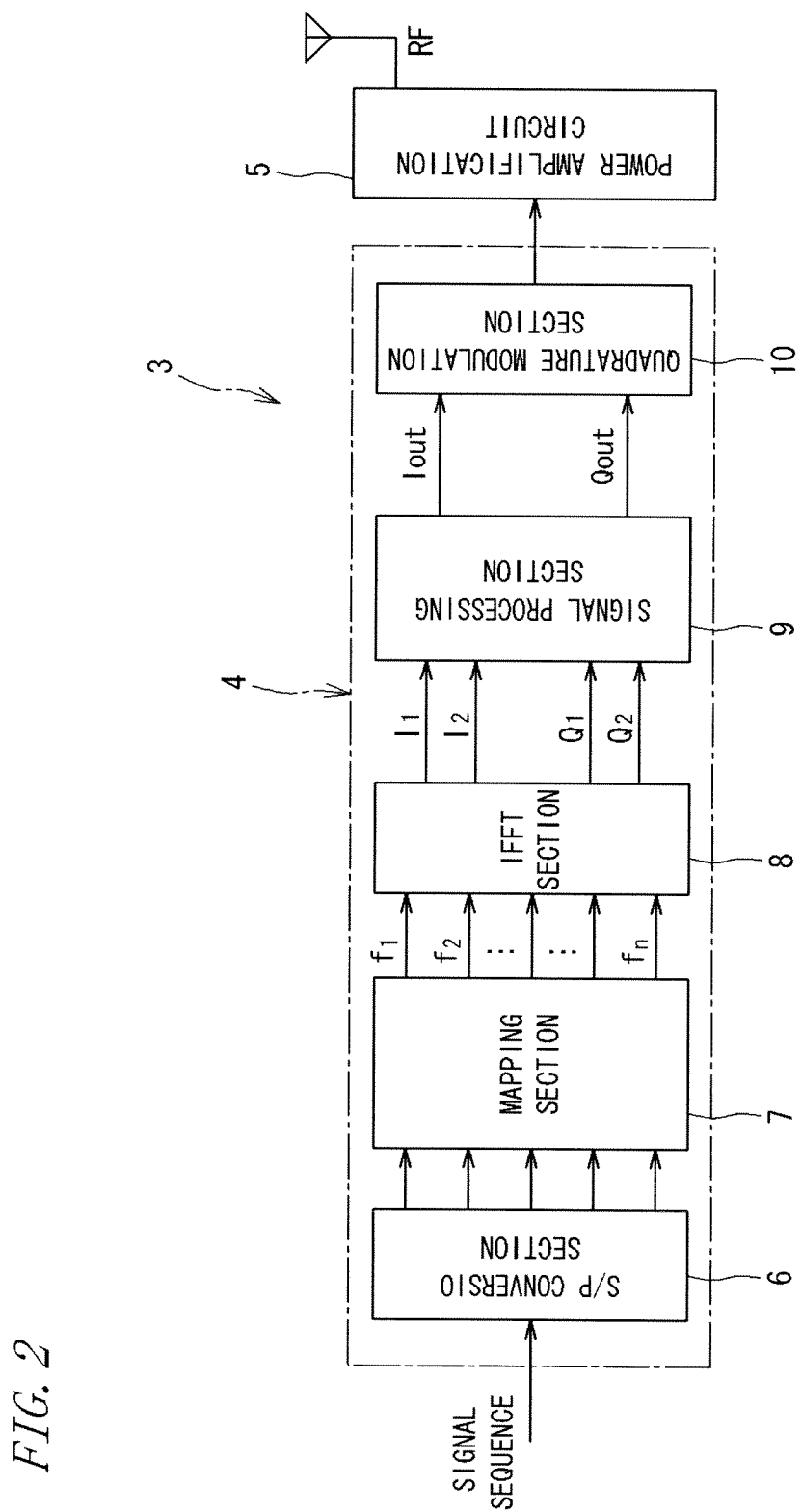
FIG. 2 is a functional block diagram showing main parts of an OFDM transmitter of a base station.

FIG. 2 is a functional block diagram showing main parts of an OFDM transmitter 3 of the base station 1.

The transmitter 3 includes a transmission processor 4, and a power amplification circuit 5, and the transmission processor 4 is, for example, composed of an FPGA (Field Programmable Gate Array) including one or more memories and CPUs.

The FPGA allows configuration information of various types of logic circuits to be set (configured) in advance at the time of shipping the processor or manufacturing the base station 1. Through such setting operations, functional sections 6 to 10 shown in FIG. 2 are configured.

That is, the transmission processor 4 of the present embodiment includes, from left to right, an S/P conversion section 6, a mapping section 7, an IFFT (Inverse Fast Fourier Transform) section 8, a signal processing section 9, and a quadrature modulation section 10, in this order.

A serial signal sequence inputted to the transmission processor 4 is converted into a plurality of signal sequences in the S/P (serial parallel) conversion section 6, and the resultant parallel signal sequences are converted, in the mapping section 7, into a plurality of subcarrier signals f1, f2, . . . and fn each having a combination of a predetermined amplitude and a phase.

The subcarrier signals f1, f2, . . . and fn are converted, by the IFFT section 8, into an I signal and a Q signal serving as a baseband signal that are orthogonal to each other on the time axis.

In the present embodiment, it is assumed that the base station 1 transmits downlink signals in two frequency bands B1 and B2. Therefore, as shown in FIG. 2, first signals I1 and Q1 whose subcarriers are included in the first frequency band B1, and second signals I2 and Q2 whose subcarriers are included in the second frequency band B2 are outputted from the IFFT section 8.

The first signals I1 and Q1 and the second signals I2 and Q2 are inputted to the signal processing section (signal processing circuit of the present embodiment) 9 in a subsequent stage, and are subjected to predetermined signal processing in the processing section 9.

The IQ signals (Iout, Qout) after the signal processing are subjected to quadrature modulation in the quadrature modulation section 10 to be a modulated wave signal, and this modulated wave signal is inputted to the power amplification circuit 5 in a subsequent stage.

Note that, the signal processing circuit 9 of the present embodiment performs a clipping process on an IQ baseband signal, which is a synthesized signal of the first signals I1 and Q1 and the second signals I2 and Q2 on the time axis, such that an instantaneous power P of the IQ baseband signal does not exceed a predetermined threshold Pth. Details of the clipping process will be described later.

The power amplification circuit 5 includes a D/A conversion circuit which converts the modulated wave signal inputted from the quadrature modulation section 10 into an analog signal, a converter that up-converts the resultant analog signal into one having an RF, and a power amplifier that amplifies the power of the RF analog signal. The amplified RF signal is transmitted from an antenna.

The power amplification circuit 5 of the present embodiment may employ a fixed voltage system in which the drain voltage of the power amplifier is constant. However, from a viewpoint of realizing a highly-efficient high-frequency amplifier, it is preferable that the power amplification circuit 5 employs an ET (envelope tracking) system.

The power amplification circuit 5 employing the ET system extracts amplitude information (envelope) from the modulated wave signal to be inputted to the power amplifier, and applies a drain voltage that corresponds to the amplitude information to the power amplifier, thereby causing the power amplifier to operate in a substantially saturated state. Accordingly, power loss that occurs in the case of an operation at a fixed voltage is reduced, and a highly-efficient power amplifier can be realized.

[Configuration of a Signal Processing Circuit]

Figure 3:
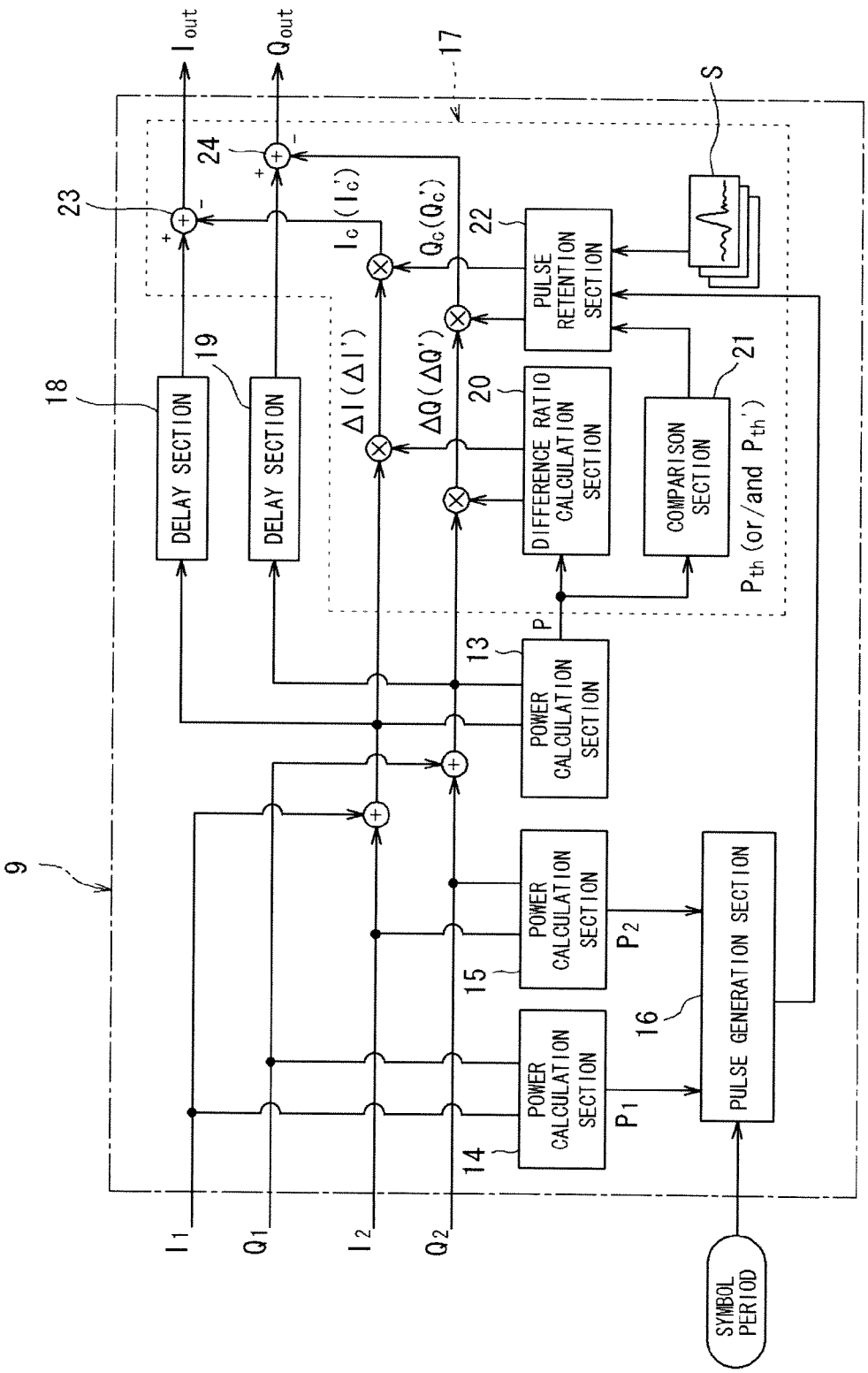
FIG. 3 is a functional block diagram of a signal processing circuit according to a first embodiment.

FIG. 3 is a functional block diagram of the signal processing circuit 9 according to the first embodiment of the present invention.

Hereinafter, a synthesized signal of the first signals I1 and Q1 and the second signals I2 and Q2 will be simply referred to as an "IQ baseband signal" or an "IQ signal".

Further, an instantaneous power of the first signals I1 and Q1 is defined as P1, an instantaneous power of the second signals I2 and Q2 is defined as P2, and an instantaneous power of the IQ baseband signal is defined as P (=P1+P2).

As shown in FIG. 3, the signal processing circuit 9 of the present embodiment includes power calculation sections 13 to 15, a pulse generation section 16, a signal processing section 17, and delay sections 18 and 19.

Of these, the power calculation section 13 calculates an instantaneous power P which is a square sum of an I component (=I1+I2) and a Q component (=Q1+Q2) of an IQ baseband signal.

The power calculation section 14 calculates an instantaneous power P1 (=I1²+Q1² of the first signals I1 and Q1, that is, a square sum of an I component (I1) and a Q component (Q1) of the first signals I1 and Q1. The power calculation section 15 calculates an instantaneous power P2 (=I2²+Q2²) of the second signals I2 and Q2, that is, a square sum of an I component (I2) and a Q component (Q2) of the second signals I2 and Q2.

The signal processing section 17 of the present embodiment is composed of a PC-CFR circuit, in which, when an instantaneous power P of an IQ baseband signal exceeds a predetermined threshold Pth, cancellation signals Ic and Qc obtained by multiplying increments ΔI and ΔQ from the threshold Pth by a predetermined cancellation pulse S are subtracted from the original IQ baseband signal, thereby performing a clipping process that suppresses the instantaneous power P of the IQ baseband signal to an instantaneous power P equivalent to the threshold Pth.

Specifically, the signal processing section 17 includes a difference ratio calculation section 20, a comparison section 21, a pulse retention section 22, and adders-subtracters 23 and 24.

Using the instantaneous power P calculated by the power calculation section 13 and the predetermined threshold Pth which has been set in advance, the difference ratio calculation section 20 calculates an increment ratio {1−SQRT(Pth/P)} of the instantaneous power P to the threshold Pth, and multiplies each component (I, Q) of the IQ baseband signal by the increment ratio {1−SQRT(Pth/P)} by using a multiplier.

Thus, increments ΔI and ΔQ of the IQ baseband signal which are amounts exceeding the threshold Pth are calculated based on the following equations. Note that, in this case, SQRT is a function which obtains a square root of a variable in parentheses (the same hereinafter).

$$\Delta I = \{1 - \text{SQRT}(Pth/P)\} \times I$$

$$\Delta Q = \{1 - \text{SQRT}(Pth/P)\} \times Q$$

The comparison section 21 compares the instantaneous power P calculated by the power calculation section 13 with the threshold Pth, and issues, to the pulse retention section 22, an instruction to output a cancellation pulse S when the instantaneous power P is greater than the threshold Pth.

The pulse retention section 22 has a memory implemented as a dual port RAM or the like, in which a below-described cancellation pulse S outputted by the pulse generation section 16 is temporarily retained. When receiving the instruction from the comparison section 21, the pulse retention section 22 multiplies the above increments ΔI and ΔQ by a cancellation pulse S retained at that time, to calculate cancellation signals Ic and Qc.

When not receiving the instruction from the comparison section 21, the pulse retention section 22 multiplies the increments ΔI and ΔQ by zero.

Therefore, with respect to an IQ baseband signal whose instantaneous power P exceeds the threshold Pth, the cancellation signals Ic and Qc calculated by the following equations are inputted to the adders-subtracters 23 and 24.

$$Ic = \Delta I \times S = \{1 - \text{SQRT}(Pth/P)\} \times I \times S$$

$$Qc = \Delta Q \times S = \{1 - \text{SQRT}(Pth/P)\} \times Q \times S$$

The delay sections 18 and 19 which are in a previous stage of the adders-subtracters 23 and 24 delay the IQ baseband signal by a time period used for the arithmetic processing performed in the power calculation section 13 and the signal processing section 17. The adders-subtracters 23 and 24 subtract the cancellation signals Ic and Qc from a component I and a component Q, respectively, of the delayed IQ signal, and output an Iout and a Qout, which constitute an IQ signal after the signal processing.

Through this subtraction, the IQ baseband signal whose instantaneous power P exceeds the threshold Pth is corrected into a signal whose instantaneous power is equivalent to the threshold Pth. An IQ baseband signal whose instantaneous power P is less than or equal to the threshold Pth is directly outputted without being corrected.

Figure 6:
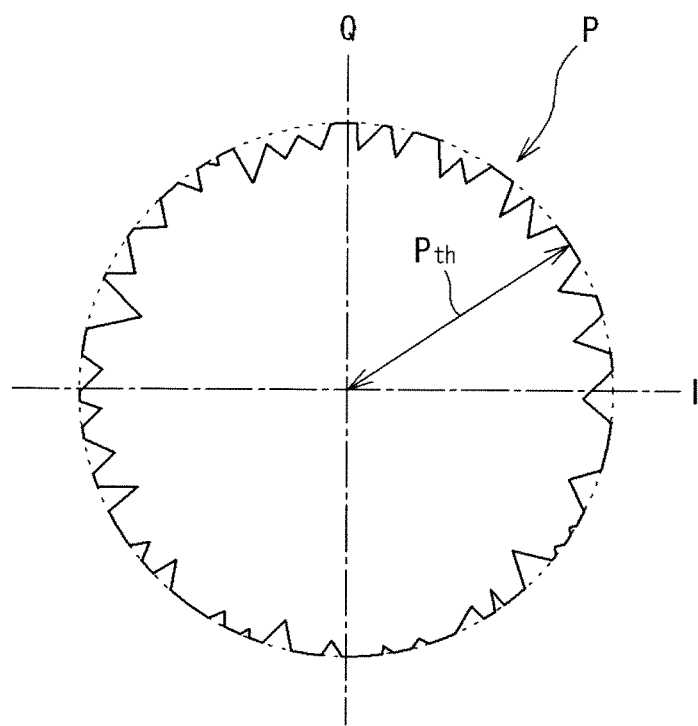
FIG. 6 is a coordinate diagram of an IQ plane indicating relationship between an IQ baseband signal and a threshold.

FIG. 6 is a coordinate diagram of an IQ plane indicating relationship between an IQ baseband signal and the threshold Pth at a time when the clipping process has been performed.

As shown in FIG. 6, signal processing performed by the signal processing circuit 9 of the present embodiment is a clipping process that cuts an outer periphery portion of the instantaneous power P of the IQ baseband signal. Therefore, the PAPR of the power amplification circuit 5 for the power amplifier is reduced, and thus, the power efficiency of the power amplifier is improved.

[Configuration of a Pulse Generation Section]

Figure 4:
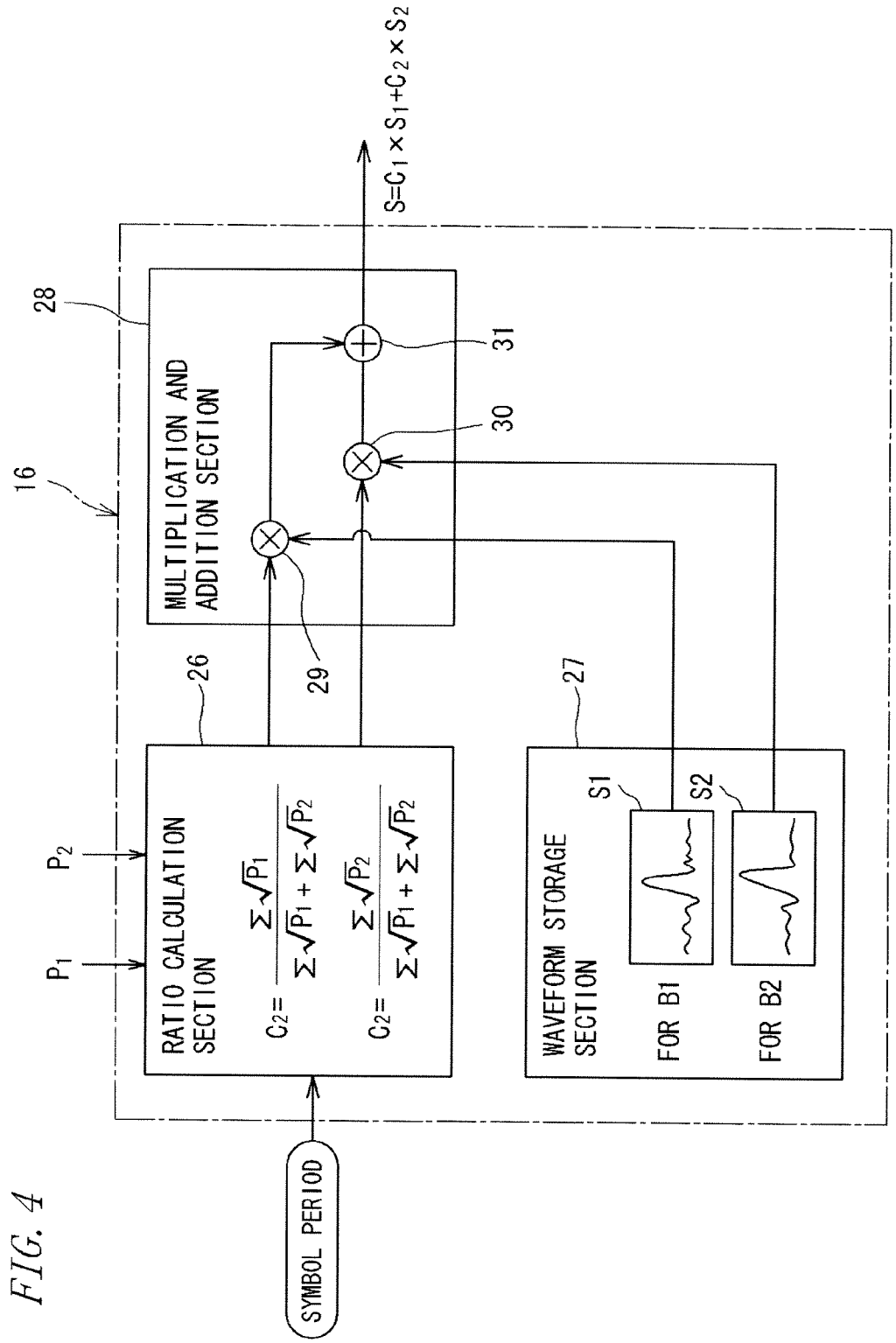
FIG. 4 is a functional block diagram of a pulse generation section.

FIG. 4 is a functional block diagram of the pulse generation section 16.

The pulse generation section 16 generates a cancellation pulse S by: multiplying basic pulses S1 and S2, which are determined in advance for the respective first and second frequency bands B1 and B2, by relative ratios C1 and C2 of average powers for the frequency bands B1 and B2, respectively; and then summing the resultant values. The pulse generation section 16 includes a ratio calculation section 26, a waveform storage section 27, and a multiplication and addition section 28.

Of these, the waveform storage section 27 is implemented as a storage device such as a memory in which the basic pulses S1 and S2 for the respective frequency bands B1 and B2 are stored. Note that, although both of the basic pulses 51 and S2 are stored in advance in the waveform storage section 27 in FIG. 4, only one basic pulse 51 (or S2) may be stored in the waveform storage section 27 and the other basic pulse S2 (or S1) may be generated by performing a frequency conversion onto a basic waveform for the corresponding frequency f2 (or f1).

The basic pulses S1 and S2 are Sinc waveforms obtained by the following manner: a plurality of (for example, N) carrier waves included in the frequency bands B1 and B2 to be used in downlink signal transmission, are inputted to the IFFT section 8 with their amplitudes being made 1/N and with their phases being made 0, as in the case of Patent Literature 3 (Japanese Laid-open Patent Publication No. 2004-135078). In this case, only the real part I appears in an output from the IFFT section 8 and the imaginary part Q is zero.

Thus, the basic pulses 51 and S2 for the first and second frequency bands B1 and B2 are waveforms consisting of the respective real parts I (Sinc waveform) obtained by subjecting a plurality of subcarriers included in the frequency band B1 and B2 to inverse Fourier transformation in the IFFT section 8, which is also used for the transmission signal.

Therefore, the frequency bands of the basic pulses S1 and S2 coincide with the first and second frequency bands B1 and B2. Thus, even when an IQ signal is clipped using cancellation signals obtained by multiplying increments of the IQ signal exceeding the threshold Pth by the basic pulses S1 and S2, occurrence of unnecessary frequency components outside the frequency bands B1 and B2 is prevented.

The instantaneous power P1 of the first signals I1 and Q1 calculated by the power calculation section 14 and the instantaneous power P2 of the second signals I2 and Q2 calculated by the power calculation section 15 are inputted to the ratio calculation section 26. Using these instantaneous powers P1 and P2, the ratio calculation section 26 calculates relative ratios C1 and C2 of average powers for the respective frequency bands B1 and B2.

$$C1 = \Sigma\sqrt{P1}/(\Sigma\sqrt{P1}+\Sigma\sqrt{P2})$$

$$C2 = \Sigma\sqrt{P2}/(\Sigma\sqrt{P1}+\Sigma\sqrt{P2})$$

In the above equations for the relative ratios C1 and C2, square roots $\sqrt{P1}$ and $\sqrt{P2}$ of the instantaneous powers P1 and P2 of the frequency bands B1 and B2 are accumulated for a predetermined sampling period, respectively, and the accumulated values $\Sigma\sqrt{P1}$ and $\Sigma\sqrt{P2}$ are each divided by a sum of the accumulated values of the frequency bands B1 and B2 ($\Sigma\sqrt{P1}+\Sigma\sqrt{P2}$).

In order to accurately perform in real time the above calculation including division of the above accumulated values, a large number of significant figures is needed, which results in a large scale circuit. However, when the sum of the accumulated values ($\Sigma\sqrt{P1}+\Sigma\sqrt{P2}$) is an exponentiation of 2, only the position of the decimal point changes and the above division need not be actually performed.

Therefore, in a case where the relative ratios C1 and C2 are calculated using the above equations, it is preferable that, when the sum of the accumulated values ($\Sigma\sqrt{P1}+\Sigma\sqrt{P2}$) coincides with an exponentiation of 2, or when the sum becomes a value that can be regarded as substantially equivalent to the exponentiation of 2, the accumulated values $\Sigma\sqrt{P1}$ and $\Sigma\sqrt{P2}$ are each divided by the exponentiation of 2 to calculate the relative ratios C1 and C2.

Figure 5:
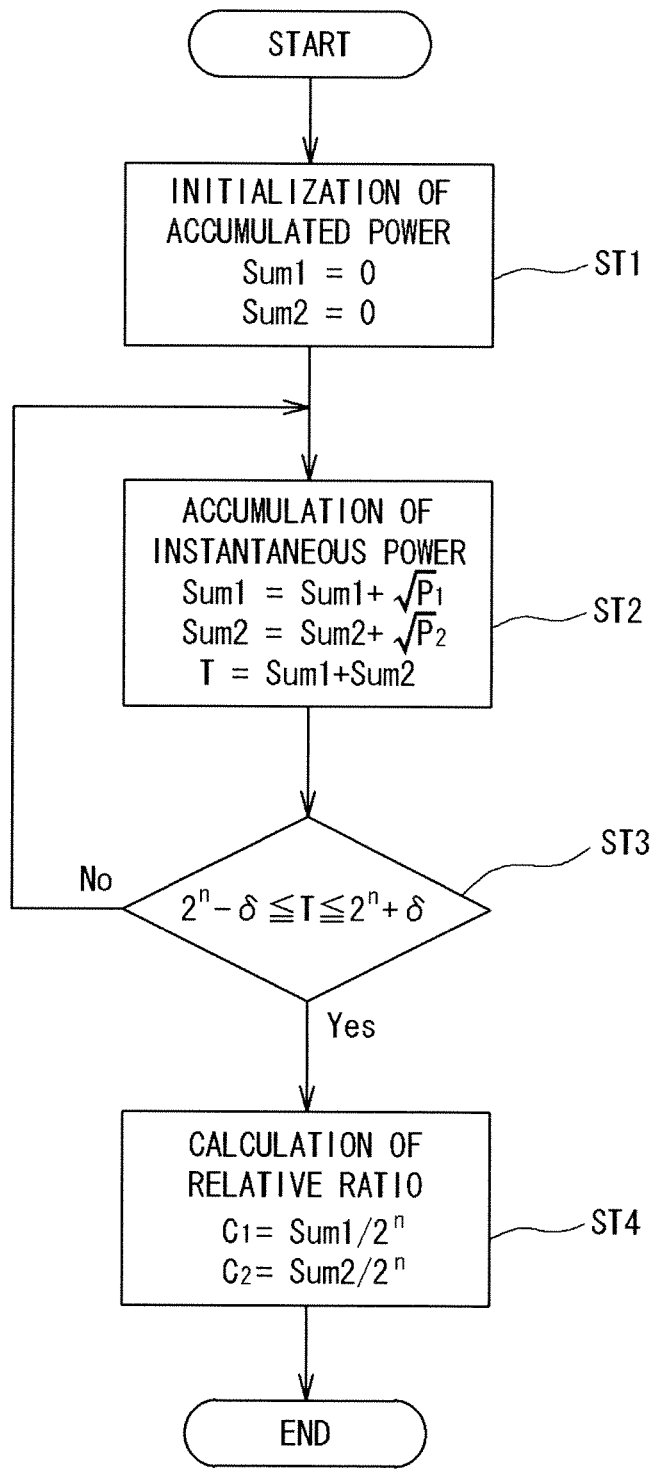
FIG. 5 is a flow chart showing an arithmetic logic performed by a ratio calculation section.

FIG. 5 is a flow chart showing the arithmetic logic performed by the ratio calculation section 26.

As shown in FIG. 5, first, the ratio calculation section 26 initializes each of the accumulated values Sum1 and Sum2 to zero (step ST1).

Next, the ratio calculation section 26 adds square roots $\Sigma\sqrt{P1}$ and $\Sigma\sqrt{P2}$ of instantaneous powers P1 and P2 to the accumulated values Sum1 and Sum2, respectively, for each sampling period, and obtains a sumT (=Sum1+Sum2) (step ST2).

Further, the ratio calculation section 26 determines whether the sumT of the accumulated values Sum1 and Sum2 is in a range of an exponentiation of $2\pm\delta$ ($\delta$ is a sufficiently small predetermined value) (step ST3). When a result of the determination is negative, the ratio calculation section 26 returns to step ST2 and repeats the accumulation.

Further, when the result of the determination is affirmative, the ratio calculation section 26 ignores $\delta$ and regards the sumT of the accumulated values ($=\Sigma\sqrt{P1}+\Sigma\sqrt{P2}$) as the exponentiation of 2, and divides the accumulated values Sum1 and Sum2 by the exponentiation of 2, and thus, calculates the relative ratios C1 and C2 (step ST4).

In this case, by only changing the position of the decimal point of each of the accumulated value Sum1 and Sum2, the relative ratios C1 and C2 can be calculated. Therefore, without increasing the scale of the circuit, the relative ratios C1 and C2 can be calculated accurately and fast.

For example, when it is assumed that Sum1=343 and Sum2=681 (each is a decimal digit), Sum1=343 ("0101010111" expressed in a binary digit), Sum2=681 ("1010101001" expressed in a binary digit), and T=1024 ("1000000000" expressed in a binary digit).

In this case, when the relative ratios C1 and C2 are calculated using these,

C1=343/1024=0.0101010111,

C2=681/1024=0.1010101001, and

C1+C2=1.0000000000.

Thus, the order of 0s and 0s below the decimal point of each accumulated value Sum1 and Sum2 does not change. Therefore, it is possible to calculate the relative ratios C1 and C2 by only changing the position of the decimal point.

With reference back to FIG. 4, the ratio calculation section 26 obtains, as a control period, the symbol period of the OFDM symbol, which is a smallest time unit in which a transmission power may greatly fluctuate, and the ratio calculation section 26 is configured to perform the above calculation of the relative ratios C1 and C2 in this symbol period.

Accordingly, the relative ratios C1 and C2 can be calculated in a stable condition where the average power of an IQ baseband signal does not fluctuate very much, and thus, accurate relative ratios C1 and C2 can be obtained.

However, in the case of the LTE, since a resource block (see FIG. 7) is a minimum unit for user allocation, 7 OFDM symbols (1 slot), which corresponds to a transmission period of the resource block, may be employed as a control period for calculating the relative ratios C1 and C2.

The multiplication and addition section 28 includes two multipliers 29 and 30 and one adder 31. The multiplier 29 multiplies the relative ratio C1, which corresponds to the first frequency band B1, by the basic pulse S1 for the frequency band B1. The multiplier 30 multiplies the relative ratio C2, which corresponds to the second frequency band B2, by the basic pulse S2 for the frequency band B2.

Further, the adder 31 adds results of the multiplications performed by the respective multipliers 29 and 30 to generate a cancellation pulse S, and outputs this pulse S to the pulse retention section 22 in the signal processing section 17. That is, the multiplier-accumulator 16 generates the cancellation pulse S based on the following equation.

$$S = C1 \times S1 + C2 \times S2$$

The multiplication and addition section 28 of the present embodiment compares the relative ratios C1 and C2 calculated in the ratio calculation section 26 with a predetermined threshold, and determines fluctuations thereof. Only when the relative ratio C1 or C2 has fluctuated to an extent exceeding the threshold, the multiplication and addition section 28 performs multiplication and summation using the relative ratios C1 and C2 after the fluctuation, and outputs a resultant cancellation pulse S to the pulse retention section 22.

Therefore, unless the relative ratio C1 or C2 fluctuates to some extent, the multiplication and addition section 28 does not perform the multiplication and summation, and the pulse retention section 22 maintains the existing cancellation pulse S. Therefore, compared with a case where a cancellation pulse S is simply generated every time the relative ratio C1 or C2 fluctuates, arithmetic loads for the circuit can be reduced.

[Effects of the First Embodiment]

The cancellation pulse S is a synthesized pulse which is obtained by adding: a result of multiplying the relative ratio C1 of an average power of the first signals I1 and Q1 corresponding to the first frequency band B1 by the basic pulse S1 for the frequency band B1; and a result of multiplying the relative ratio C2 of an average power of the second signals I2 and Q2 corresponding to the second the frequency band B2 by the basic pulse S2 for the frequency band B2.

Accordingly, even when the cancellation signals Ic and Qc, which are obtained by multiplying the increments ΔI and ΔQ by the cancellation pulse S, are subtracted from the original IQ baseband signal, the amplitude of the IQ baseband signal will be canceled in accordance with the average powers for the respective first and second frequency bands B1 and B2.

Therefore, according to the signal processing circuit 9 of the present embodiment, powers for the respective first and second frequency bands B1 and B2 are not reduced more than necessary, by the subtraction of the cancellation signals Ic and Qc. Thus, even in the case of an IQ baseband signal having different average powers for the respective frequency bands B1 and B2, the clipping process can be appropriately performed on the IQ baseband signal without degrading the SNR.

Second Embodiment

Figure 8:
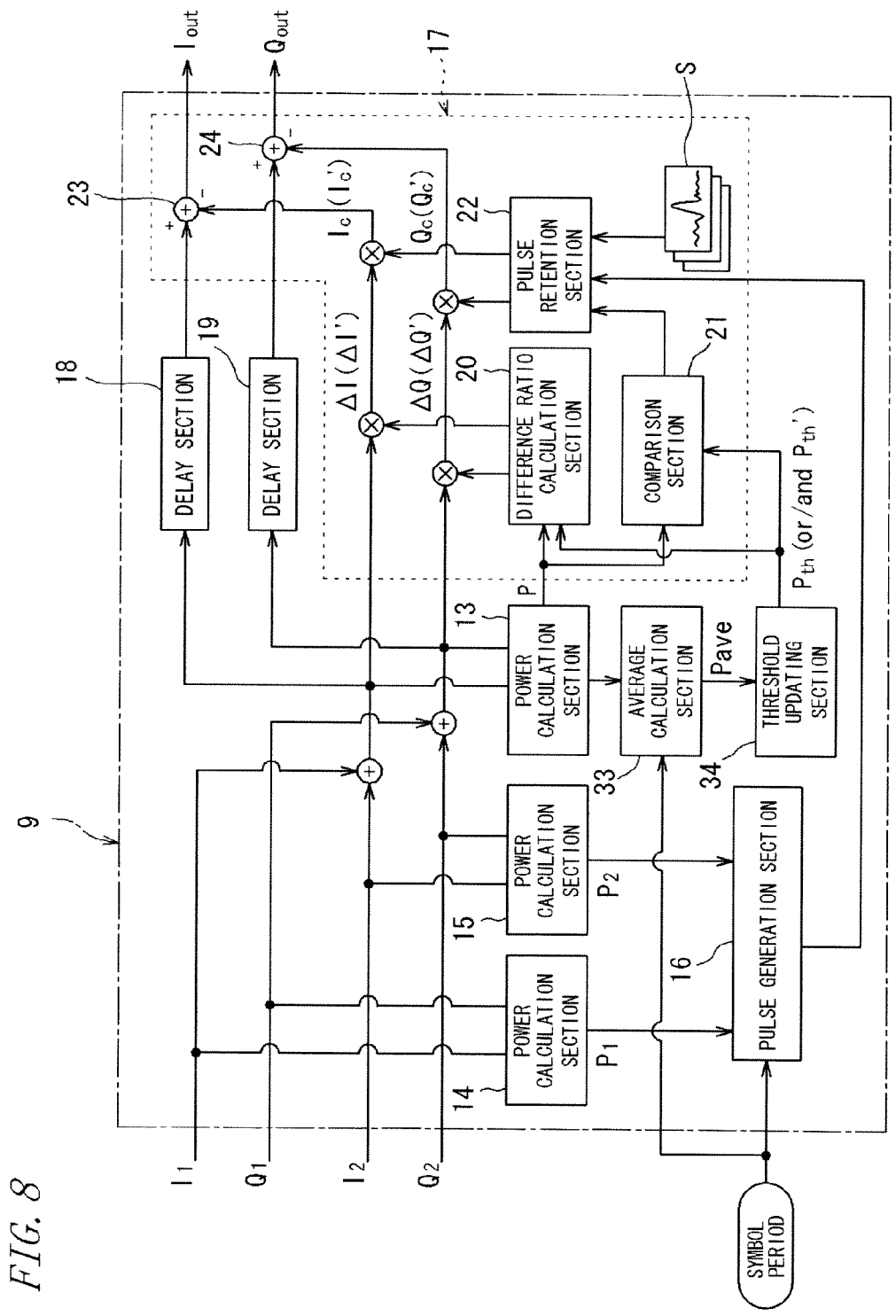
FIG. 8 is a functional block diagram of a signal processing circuit according to a second embodiment.

FIG. 8 is a functional block diagram of the signal processing circuit 9 according to a second embodiment.

As shown in FIG. 8, the signal processing circuit 9 (FIG. 8) of the present embodiment is different from the signal processing circuit 9 (FIG. 3) of the first embodiment in that the signal processing circuit 9 (FIG. 8) includes an average calculation section 33 and a threshold updating section 34.

Hereinafter, common components and functions in the present embodiment and the first embodiment are denoted by the same reference characters and description thereof will be omitted. Differences between the present embodiment and the first embodiment will be mainly described.

The average calculation section 33 obtains the symbol period of the OFDM symbol, which is a smallest time unit in which a transmission power can greatly fluctuate, as a control period for calculating an average power Pave of an IQ baseband signal.

That is, the average calculation section 33 obtains instantaneous powers P of the IQ baseband signal from the power calculation section 13, and averages the instantaneous powers P in the symbol period, to calculate an average power Pave of the IQ baseband signal for each symbol period, and outputs the average power Pave to the threshold updating section 34.

The threshold updating section 34 employs a value obtained by multiplying an average power Pave of each symbol period obtained from the average calculation section 33 by a predetermined multiplying rate, as a threshold Pth for the symbol period. For example, when the ratio of a peak power Ppeak to an average power Pave of an IQ baseband signal is to be narrowed to 6 dB, the above-described predetermined multiplying rate is doubled.

By calculating the threshold Pth for each symbol period as described above, the threshold updating section 34 dynamically updates the threshold Pth, and outputs the updated threshold Pth to the difference ratio calculation section 20 and the comparison section 21.

Then, the comparison section 21 compares the threshold Pth obtained from the threshold updating section 34 with the instantaneous power P calculated by the power calculation section 13. When the instantaneous power P exceeds the updated threshold Pth, the comparison section 21 issues, to the pulse retention section 22, an instruction to output a cancellation pulse S.

Figure 9:
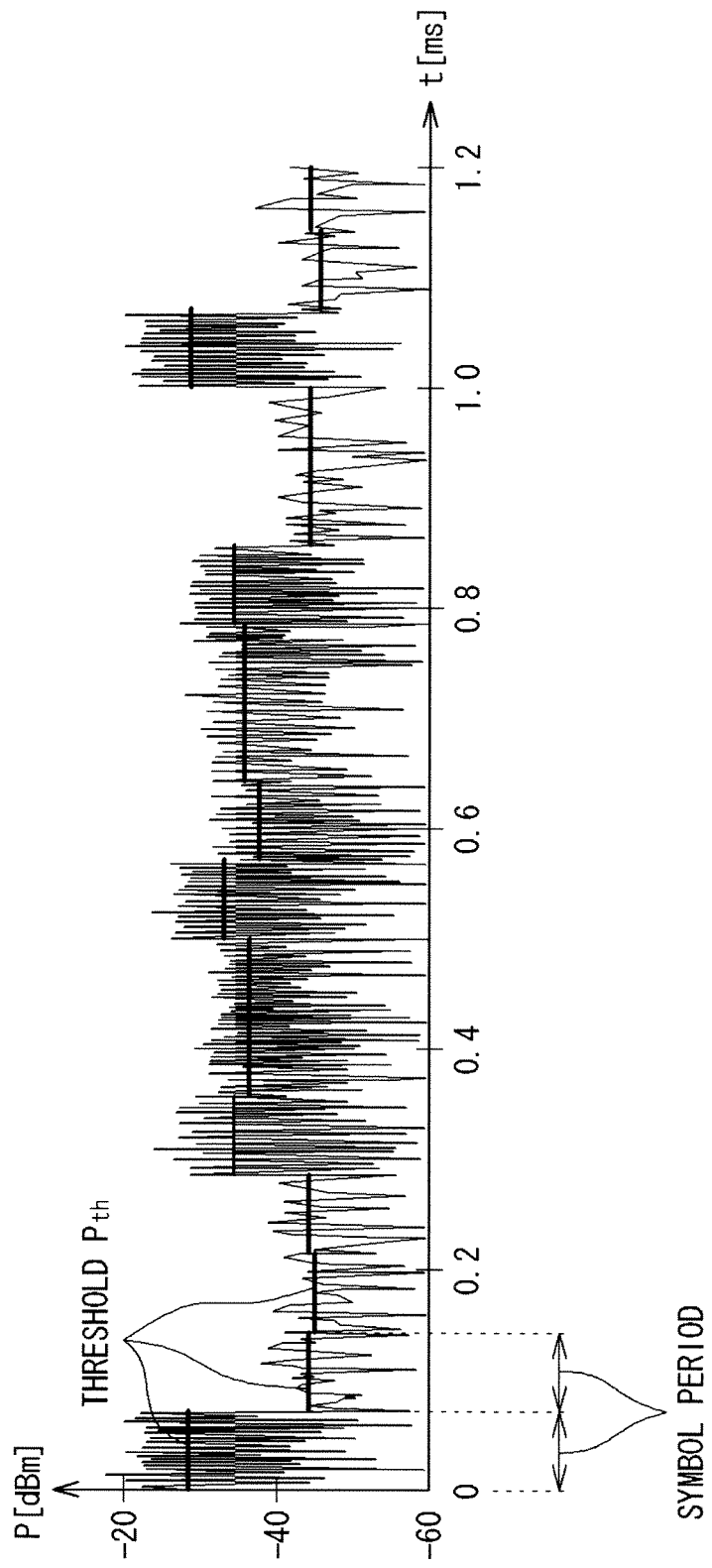
FIG. 9 is a graph showing temporal changes of an instantaneous power of an IQ baseband signal and a threshold sequentially updated.

FIG. 9 is a graph showing temporal changes of the instantaneous power P of an IQ baseband signal and the threshold Pth that is sequentially updated.

As shown in FIG. 9, in the present embodiment, the threshold Pth used in the clipping process in the signal processing circuit 9 is sequentially calculated based on an average power Pave calculated for each symbol period (1/14 ms) and is updated for the symbol period.

Therefore, for example, even when the average power Pave of the IQ baseband signal fluctuates in accordance with a fluctuation of the communication traffic by the mobile terminals 2, the clipping process by the signal processing circuit 9 is always performed. Accordingly, improvement of the power efficiency of the power amplifier brought by a reduced PAPR can be effectively secured.

Moreover, according to the signal processing circuit 9 of the present embodiment, the symbol period of the OFDM, which is a smallest time unit in which a transmission power may fluctuate, is employed as a control period for which the threshold Pth is updated. This is another advantage in that the threshold Pth can be updated accurately and fast.

However, as in the case of the first embodiment, since the resource block (see FIG. 7) is a minimum unit for user allocation in the LTE, 7 OFDM symbols (1 slot) which is a transmission period for the resource block may be employed as a control period for which the threshold Pth is updated.

Third Embodiment

Figure 10:
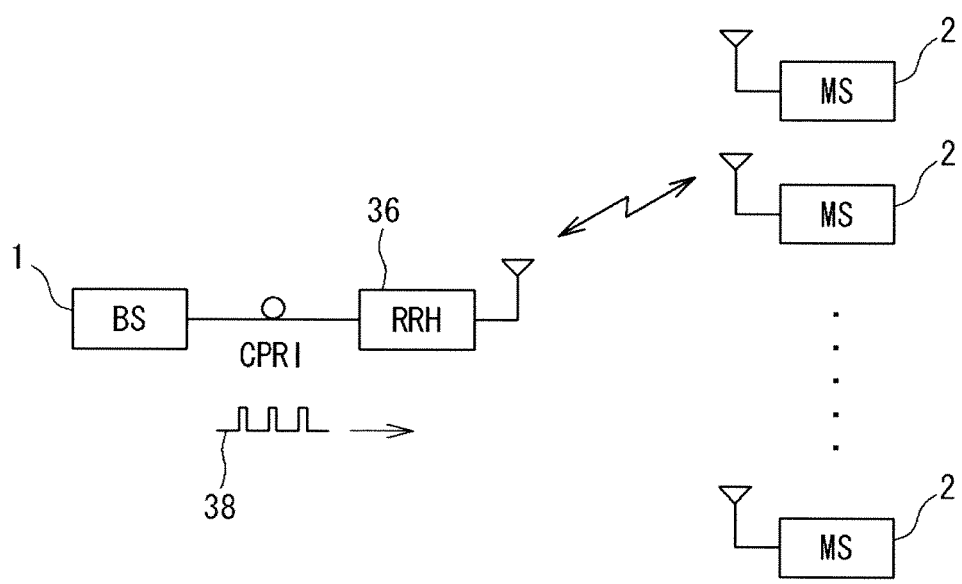
FIG. 10 shows an overall configuration of a radio communication system according to a third embodiment.

FIG. 10 shows an overall configuration of a radio communication system according to a third embodiment of the present invention.

As shown in FIG. 10, in the radio communication system of the present embodiment, an RRH (Remote Radio Head) 36 is connected to the base station 1 via a CPRI (Common Public Radio Interface). The RRH 36 is provided with the signal processing circuit 9 shown in FIG. 11 according to the third embodiment and the power amplification circuit 5 described above.

Moreover, in the present embodiment, the base station 1 transmits a synchronization signal 38 for establishing synchronization with the RRH 36 via a fiber to the RRH 36. The synchronization signal 38 is a clock signal having a 1 ms period that synchronizes with the symbol period of the OFDM.

Figure 11:
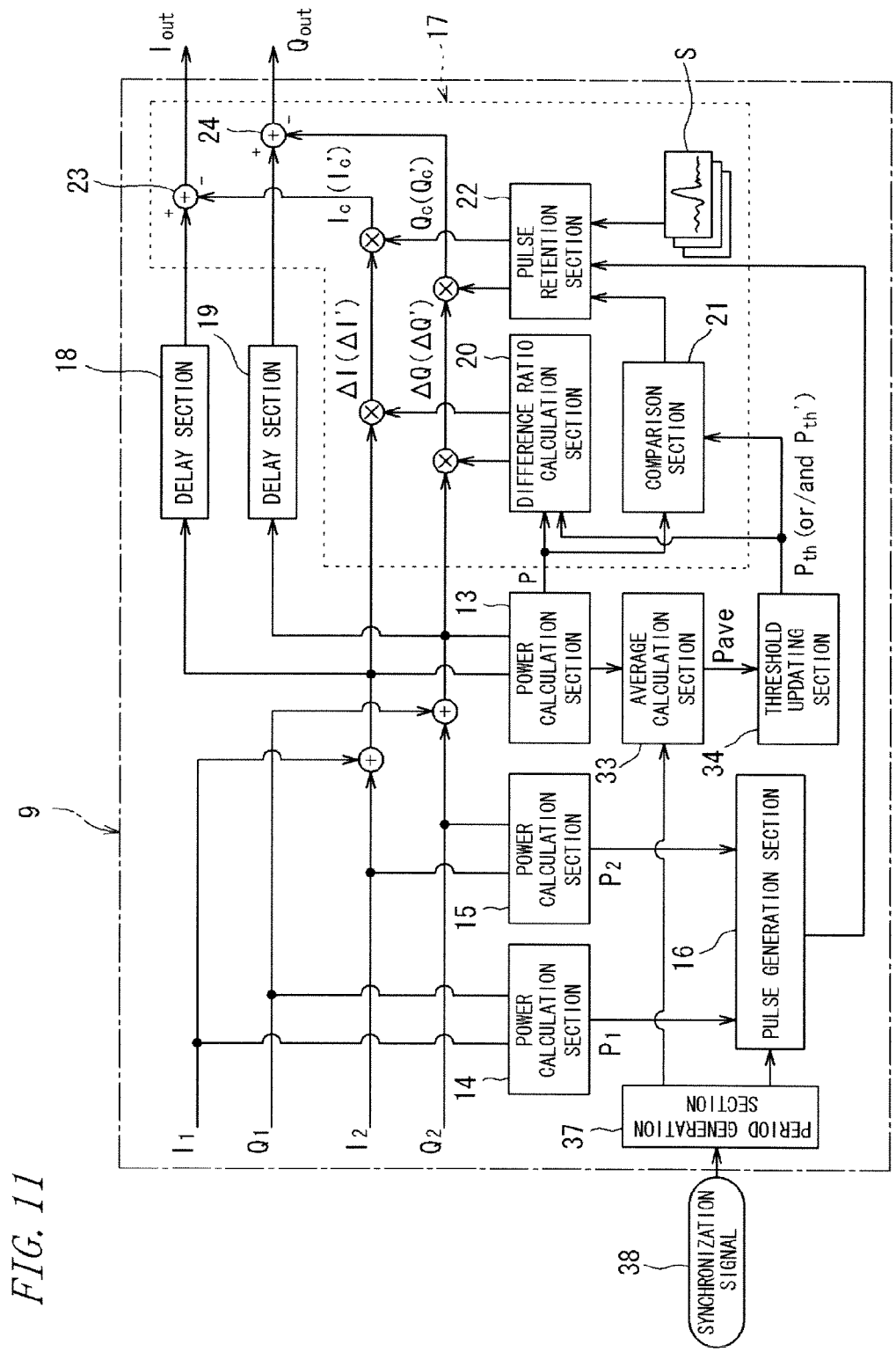
FIG. 11 is a functional block diagram of a signal processing circuit according to the third embodiment.

As shown in FIG. 11, the signal processing circuit 9 of the present embodiment is provided with a period generation section 37 into which the synchronization signal 38 is inputted.

The period generation section 37 generates a symbol period based on the synchronization signal 38 obtained from the base station 1, which is an external device, and outputs the generated symbol period to the pulse generation section 16 and the average calculation section 33. Other components in FIG. 11 are the same as those in the signal processing circuit 9 of the second embodiment (FIG. 8), and thus, are denoted by the same reference characters as in FIG. 8, and description thereof will be omitted.

As described above, in the present embodiment, the synchronization signal 38 that synchronizes with the symbol period of the OFDM is obtained from the base station 1, and a symbol period is generated based on the synchronization signal 38. Therefore, the signal processing circuit 9 of the present invention can be mounted in the RRH 36.

[Modification 1 of the Signal Processing Section (Boosting Process)]

In the signal processing circuit 9 (FIG. 3, FIG. 8, and FIG. 11) of the first to the third embodiments, the signal processing section 17 performs the "clipping process" which suppresses an instantaneous power P of an IQ baseband signal that is greater than a threshold (first threshold) Pth, which is for clipping and which defines an upper limit for an instantaneous power P, to an instantaneous power P equivalent to the threshold Pth. In the reverse of this process, the signal processing section 17 may perform a process which raises the bottom level of an instantaneous power P of an IQ baseband signal that is smaller than a predetermined second threshold Pth' (<Pth), to an instantaneous power P equivalent to the threshold Pth' (hereinafter this process will be referred to as a "boosting process").

The signal processing section 17 that performs the "boosting process" can be realized in the same circuit configuration as in the first to the third embodiments (FIG. 3, FIG. 8, and FIG. 11), by reversing the operations performed by the difference ratio calculation section 20 and the comparison section 21 in the clipping process.

Hereinafter, operations of the signal processing section 17 that performs the "boosting process" will be described, using FIG. 3 as an example.

That is, in the signal processing section 17 in this case, using an instantaneous power P calculated by the power calculation section 13 and a second threshold Pth' for boosting that has been set in advance, the difference ratio calculation section 20 calculates a decrement ratio {SQRT(Pth'/P)−1} of the instantaneous power P to the second threshold Pth', and multiplies each component (I, Q) of the IQ baseband signal by this decrement ratio {SQRT(Pth'/P)−1} using a multiplier.

Therefore, decrements ΔI' and ΔQ' of the IQ baseband signal which are amounts less than the threshold Pth' are calculated based on the following equations.

$$\Delta I' = \{SQRT(Pth'/P)-1\} \times I$$

$$\Delta Q' = \{SQRT(Pth'/P)-1\} \times Q$$

The comparison section 21 compares the instantaneous power P calculated by the power calculation section 13 with the second threshold Pth', and issues, to the pulse retention section 22, an instruction to output a cancellation pulse S when the instantaneous power P is less than the second threshold Pth'.

When receiving the output instruction from the comparison section 21, the pulse retention section 22 multiplies the above decrements ΔI' and ΔQ' by a cancellation pulse S retained at that time, to calculate cancellation signals Ic' and Qc', respectively.

When not receiving the instruction from the comparison section 21, the pulse retention section 22 multiplies the decrement ΔI' and ΔQ' by zero.

Therefore, with respect to an IQ baseband signal whose instantaneous power P is less than the second threshold Pth', the cancellation signals Ic' and Qc' calculated based on the following equations are inputted to the adders-subtracters 23 and 24.

$$Ic' = \Delta I' \times S = \{SQRT(Pth'/P)-1\} \times I \times S$$

$$Qc' = \Delta Q' \times S = \{SQRT(Pth'/P)-1\} \times Q \times S$$

The delay sections 18 and 19 which are in a previous stage of the adders-subtracters 23 and 24 delay the IQ baseband signal by a time period used for the arithmetic processing performed in the power calculation section 13 and the signal processing section 17. The adders-subtracters 23 and 24 add the cancellation signals Ic' and Qc' to components I and Q, respectively, of the delayed IQ signal, and output an Iout and a Qout, respectively, which constitute an IQ signal after the signal processing.

Through this addition, an IQ baseband signal whose instantaneous power P is less than the second threshold Pth' is corrected into a signal whose instantaneous power is equivalent to the second threshold Pth'. An IQ baseband signal whose instantaneous power P is greater than or equal to the threshold Pth' is directly outputted without being corrected.

In this case, even when the cancellation signals Ic' and Qc', which are obtained by multiplying the decrements ΔI' and ΔQ' by the cancellation pulse S, are added to the original IQ baseband signal, the amplitude of the IQ baseband signal will be canceled in accordance with the average powers for the respective first and second frequency bands B1 and B2.

Therefore, also in the case of the signal processing circuit 9 that performs the boosting process, powers for the respective first and second frequency bands B1 and B2 are not increased more than necessary, by the addition of the cancellation signals Ic' and Qc'. Thus, even in the case of an IQ baseband signal having different average powers for the respective frequency bands B1 and B2, the boosting process can be appropriately performed on the IQ baseband signal without degrading the SNR.

Figure 12:
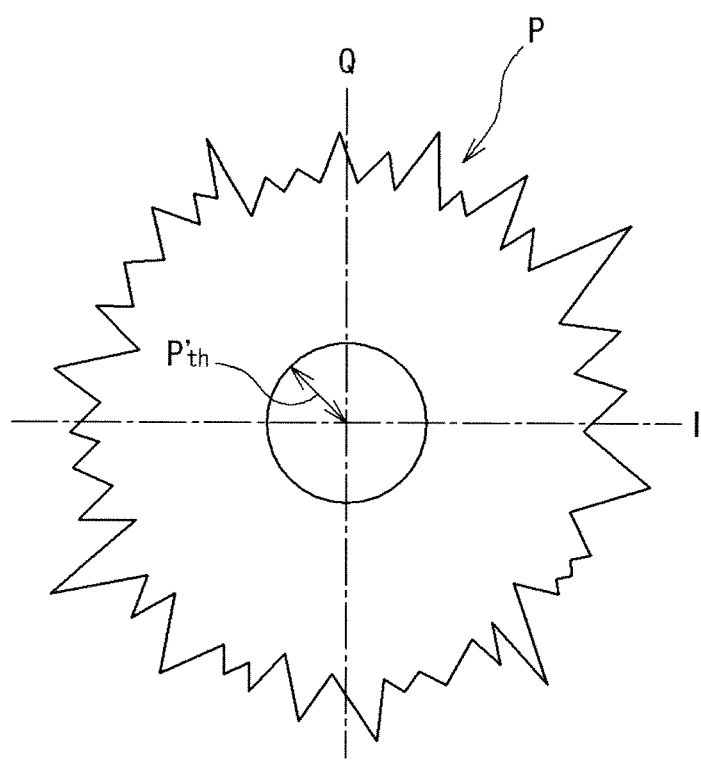
FIG. 12 is a coordinate diagram of an IQ plane indicating relationship between an IQ baseband signal and a second threshold when a boosting process has been performed.

FIG. 12 is a coordinate diagram of an IQ plane indicating relationship between an IQ baseband signal and the second threshold Pth', at a time when the boosting process has been performed.

As shown in FIG. 12, the boosting process performed by the signal processing circuit 9 of the present embodiment is a process such as cutting off an inner portion of the instantaneous power P of the IQ baseband signal, in reverse of the conventional clipping process that cuts an outer periphery portion of the instantaneous power P of the IQ baseband signal. In this manner, also in the case of the "boosting process" that raises the bottom level of the instantaneous power P, the PAPR of the modulated wave signal inputted to the power amplification circuit 5 is reduced. Thus, the power efficiency of the power amplifier is improved.

On the other hand, also in the signal processing circuit 9 of the second embodiment (FIG. 8), the signal processing section 17 may perform the boosting process.

In this case, the threshold updating section 34 employs a value obtained by multiplying an average power Pave of each symbol period obtained from the average calculation section 33 by a predetermined multiplying rate, as a threshold Pth' for boosting for the symbol period. For example, when the ratio of an average power Pave to a valley power (inverse peak power) Pvalley of an IQ baseband signal is narrowed to 6 dB, the above-described predetermined multiplying rate is halved.

By calculating the threshold Pth' for the boosting for each symbol period as described above, the threshold updating section 34 dynamically updates the threshold Pth', and outputs the updated threshold Pth' to the difference ratio calculation section 20 and the comparison section 21.

Then, the comparison section 21 compares the threshold Pth' obtained from the threshold updating section 34 with the instantaneous power P calculated by the power calculation section P. When the instantaneous power P is less than the updated threshold Pth', the comparison section 21 issues the output instruction.

Figure 13:
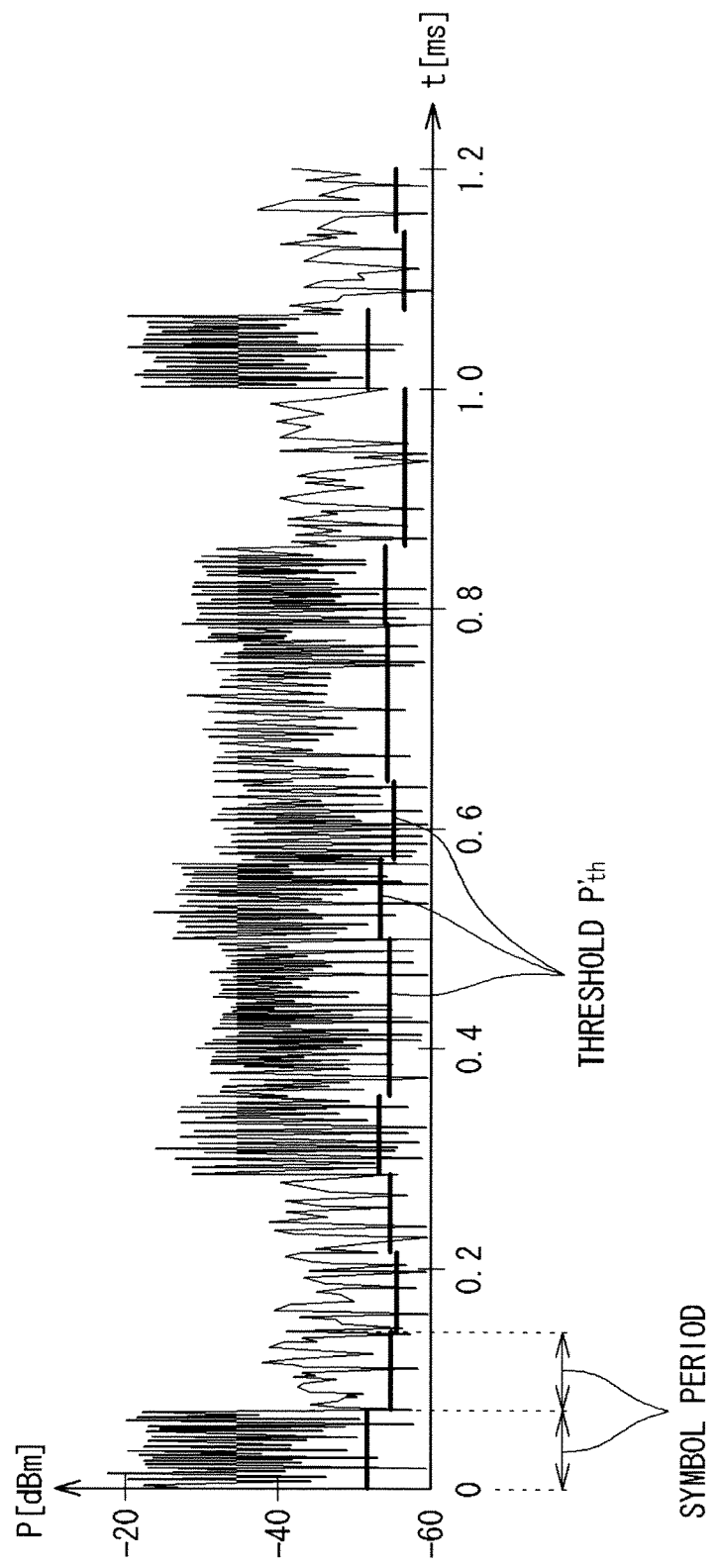
FIG. 13 is a graph showing temporal changes of an instantaneous power of an IQ baseband signal and a second threshold that is sequentially updated.

FIG. 13 is a graph showing temporal changes of the instantaneous power P of an IQ baseband signal and the second threshold Pth' that is sequentially updated.

As shown in FIG. 13, the threshold Pth' used in the boosting process in the signal processing circuit 9 is sequentially calculated based on an average power Pave calculated for each symbol period (1/14 ms) and is updated for the symbol period.

Therefore, even when the signal processing circuit 9 of the third embodiment performs the boosting process, advantageous effects as in the case of the clipping process can be attained.

That is, for example, even when the average power Pave of the IQ baseband signal fluctuates in accordance with a fluctuation of the communication traffic by the mobile terminals 2, the boosting process is always performed by the signal processing circuit 9. Accordingly, improvement of the power efficiency of the power amplifier brought by a reduced PAPR fan be effectively secured.

Note that the signal processing circuit 9 of the third embodiment (FIG. 11) which has the period generation section 37 which generates a symbol period based on the synchronization signal 38 from the base station 1 can also employ the signal processing section 17 that performs the above-described "boosting process". In this case, the signal processing circuit 9 can be mounted in the RRH 36 as in the case of the third embodiment.

[Modification 2 of the Signal Processing Section (Employing Both Clipping and Boosting Processes)]

Further, in the signal processing circuit 9 (FIG. 3, FIG. 8, and FIG. 11) of the first to the third embodiments, the signal processing section 17 may perform both of the clipping process and the boosting process onto an IQ baseband signal.

In this case, using two thresholds, that is, the first threshold Pth for the clipping process and the second threshold Pth' for the boosting process, the difference ratio calculation section 20 calculates both of an increment ratio {1−SQRT(Pth'/P)} and a decrement ratio {SQRT(Pth'/P)−1} of the instantaneous power P to the respective thresholds Pth and Pth'.

The difference ratio calculation section 20 multiplies components (I, Q) of the IQ baseband signal by each of the above rates by use of multipliers, to calculate the increments ΔI and ΔQ and the decrements ΔI' and ΔQ'.

The comparison section 21 compares the instantaneous power P calculated by the power calculation section 13 with the first and the second thresholds Pth and Pth'. When an instantaneous power P is greater than the first threshold Pth and when an instantaneous power P is less than the second threshold Pth', the comparison section 21 issues an instruction to output a cancellation pulse S to the pulse retention section 22.

When receiving the output instruction from the comparison section 21, the pulse retention section 22 multiplies the above increments ΔI and ΔQ or the above decrements ΔI' and ΔQ' by a cancellation pulse S retained at that time, to calculate cancellation signals Ic and Qc for clipping or cancellation signals Ic' and Qc' for boosting.

When not receiving the instruction from the comparison section 21, the pulse retention section 22 multiplies the increments ΔI and ΔQ or the decrements ΔI' and ΔQ' by zero.

Therefore, with respect to an IQ baseband signal whose instantaneous power P exceeds the first threshold Pth, cancellation signals Ic and Qc calculated by the following equations are inputted to the adders-subtracters 23 and 24. With respect to an IQ baseband signal whose instantaneous power P is less than the second threshold Pth', cancellation signals Ic' and Qc' calculated by the following equations are inputted to the adders-subtracters 23 and 24.

$Ic=\Delta I \times S=\{1-\text{SQRT}(Pth/P)\} \times I \times S$ $Qc=\Delta Q \times S=\{1-\text{SQRT}(Pth/P)\} \times Q \times S$ $Ic'=\Delta I' \times S=\{\text{SQRT}(Pth'/P)-1\} \times I \times S$ $Qc'=\Delta Q' \times S=\{\text{SQRT}(Pth'/P)-1\} \times Q \times S$ The adders-subtracters 23 and 24 subtract the cancellation signals Ic and Qc from components I and Q of the delayed IQ signal, or add the cancellation signals Ic' and Qc' to the components I and Q of the delayed IQ signal, and outputs an Iout and a Qout, which constitute an IQ signal after the signal processing.

Through this subtraction or addition, an IQ baseband signal whose instantaneous power P exceeds the first threshold Pth is corrected into a signal whose instantaneous power is equivalent to the first threshold Pth, and an IQ baseband signal whose instantaneous power P is less than the second threshold Pth' is corrected into a signal whose instantaneous power is equivalent to the second threshold Pth'.

Figure 14:
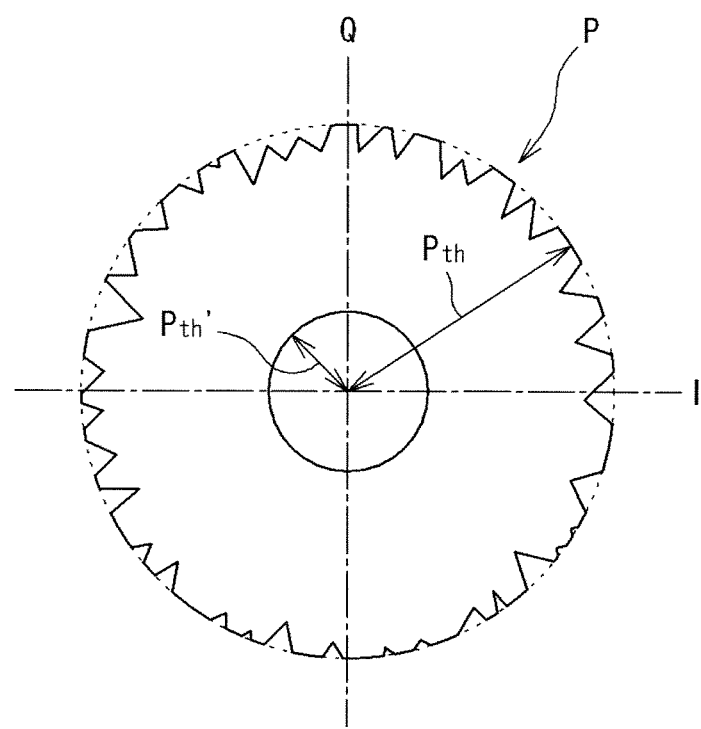
FIG. 14 is a coordinate diagram of an IQ plane indicating relationship between an IQ baseband signal and first and second thresholds when both of a clipping process and a boosting process have been performed.

FIG. 14 is a coordinate diagram of an IQ plane indicating relationship between an IQ baseband signal and the first and second thresholds Pth and Pth' at a time when both of the clipping process and the boosting process have been performed.

As shown in FIG. 14, when both of the clipping process and the boosting process are performed, an outer periphery portion of the instantaneous power P of the IQ baseband signal is cut and an inner portion of the instantaneous power P of the IQ baseband signal is cut off. Therefore, compared with a case where only one of the processes is performed, the PAPR of the modulated wave signal to be inputted to the power amplification circuit 5 can be further reduced.

[Variations of the Basic Pulses]

FIG. 15 shows graphs showing variations of basic pulses S1 and S2 in the time domain. In FIG. 15, (a) is a Sinc waveform, (b) is a Chebyshev waveform, and (c) is a Taylor waveform.

All of these waveforms can be mathematically expressed by the following equation (1), and in the case of Sinc waveform, $a_n=n\pi$.

[Equation 1]

$$y = f(x) = \prod_{n=1} \left[1 - \left(\frac{x}{a_n}\right)^2\right] \qquad (1)$$

in the case of Sinc, $a_n=n\pi$.

Here, when a section that includes a maximum absolute amplitude to zero amplitudes (the hatched area in FIG. 15) is referred to as a main lobe section, the Sinc waveform has relatively large amplitudes in side lobes, and thus, the rate of energy localized in the main lobe section cannot be improved very much.

In contrast, in the case of the Chebyshev waveform, the amplitude of the side lobes can be reduced by adjusting values of the sequence $a_n$ included in a solution of x that makes the amplitude value zero. However, in this case, the amplitude does not attenuate.

In the case of the Taylor waveform, for several points in the beginning of the sequence $a_n$ (for example, a1 and a2), values of the Chebyshev waveform are used, and for points that follow those points, values of the Sinc waveform are used. Accordingly, the Taylor waveform has attained both of amplitude suppression and attenuation characteristics in the side lobes.

Therefore, when the rate of energy localized in the main lobe section to the entire energy (a squared amplitude) in a predetermined time section T that defines the basic pulse S1 or S2 is compared among the Sinc waveform, the Chebyshev waveform, and the Taylor waveform, the rate is 91% in the case of the Sinc waveform, 93% in the case of the Chebyshev waveform, and about 95% in the case of the Taylor waveform, and thus, the Taylor waveform is most advantageous.

Note that the above predetermined time section T is a waveform sampling time period stored in the memory, and is a time period that corresponds to an upper limit number of sampling points. For example, in the case of the LTE, since the number of samples included in 1 symbol period (1/14 ms) is 2048, if it is assumed that 4 times oversampling is performed in the time domain, the upper limit number of sampling points necessary to define the waveform of the basic pulse S1 or S2 is: 2048×4=8192.

When each of the basic pulses S1 and S2 that can be used in the present invention is to be specified by a numeral range of the rate of energy localized in the main lobe section in the predetermined time section T, the rate of localized energy is preferably 85% to 99%.

This is because when the rate of localized energy is 100%, the basic pulses S1 and S2 become impulses (delta function), and cannot be applied any more to the present invention which has a frequency band limitation, and when the rate of the localized energy is less than 85%, the shapes of the pulses become too blunt and cannot be used any more.

Therefore, the technical features of the basic pulses S1 and S2 used in the present invention are as follows:

Feature 1: The basic pulses S1 and S2 can be formed from waveforms whose rate of energy localized in the main lobe section to the entire energy (a squared amplitude) in a predetermined time section T (for example, 1 symbol period) is 85% to 99%.

Feature 2: When the basic pulses S1 and S2 are mathematically described, each of the basic pulses S1 and S2 is formed of a waveform expressed by the equation (1) above, which has symmetry in the time domain.

Feature 3: More specifically, each of the basic pulses S1 and S2 is formed of a Sinc waveform, a Chebyshev waveform, or a Taylor waveform. Of these, the Sinc waveform is a waveform composed of the real part (I signal) obtained by subjecting a plurality of carrier waves in a frequency band to inverse Fourier transformation, with their amplitudes made identical to each other and with their phases made zero.

[Other Modifications]

The embodiments disclosed in the present invention are all illustrative and not restrictive. The scope of the invention is indicated by the appended claims, and all changes which come within the meaning and range of equivalency of the claims are therefore intended to be embraced therein.

For example, in the above embodiments, an exemplary case where the base station 1 uses the two frequency bands B1 and B2 has been described. However, even in a case where three or more frequency bands are to be used, the signal processing circuit 9 of the present invention can be configured.

Moreover, the signal processing circuit 9 of the present invention can be applied not only to a communication device complying with the LTE but also to a communication device complying with the W-CDMA.

In the W-CDMA, a transmission power of the base station 1 is configured to be controlled by a closed loop transmission power control, and the control period therefor serves as a minimum time unit for controlling the transmission. Specifically, the control period is one fifteenth of one radio frame period 10 ms (=about 0.667 ms)

Thus, in a case where the signal processing circuit 9 of the present invention is to be used in a transmitter conforming to the W-CDMA, the control period for the closed loop transmission power control may be employed as a control period for calculating the relative ratios C1 and C2 and updating the thresholds Pth and Pth'.

Moreover, in the above embodiments, an exemplary case where the signal processing circuit 9 that performs the clipping process based on the PC-CFR has been described. However, the present invention can also be applied to the signal processing circuit 9 that performs the clipping process based on the NS-CFR.

DESCRIPTION OF THE REFERENCE CHARACTERS 1 base station
2 mobile terminal
3 transmitter
4 transmission processor
5 power amplification circuit
9 signal processing section (signal processing circuit)
13 power calculation section
14 power calculation section
15 power calculation section
16 pulse generation section
17 signal processing section
20 comparison section
21 difference ratio calculation section
22 pulse retention section
23, 24 adder-subtracter
26 ratio calculation section
27 waveform storage section
28 multiplication and addition section
33 average calculation section
34 threshold updating section
B1 first frequency band
B2 second frequency band
Pth first threshold (for clipping)
Pth' second threshold (for boosting)
$\Delta I$ increment
$\Delta Q$ increment
Ic cancellation signal
Qc cancellation signal
$\Delta I'$ decrement
$\Delta Q'$ decrement
Ic' cancellation signal
Qc' cancellation signal
S cancellation pulse
S1 basic pulse
S2 basic pulse
C1 relative ratio
C2 relative ratio

The invention claimed is:

1. A signal processing circuit for reducing a peak-to-average power ratio of a modulated wave signal to be inputted to a power amplification circuit, the signal processing circuit comprising:

a power calculation section that calculates an instantaneous power of an IQ baseband signal of the modulated wave signal;

a pulse generation section that generates, by using a plurality of basic pulses determined for respective frequency bands of the IQ baseband signal, one cancellation signal capable of canceling the IQ baseband signal in accordance with an average power for each frequency band;

a signal processing section that limits, by using the cancellation signal, an amplitude of the IQ baseband signal so as to cause an upper limit or a lower limit, or both of the upper limit and the lower limit of the instantaneous power to be equivalent to a corresponding predetermined threshold(s), wherein each of the basic pulses has a waveform mathematically expressed by the following equation (1) which has symmetry in a time domain:

$$y = f(x) = \prod_{n=1} \left[1 - \left(\frac{x}{a_n}\right)^2\right] \quad (1)$$

in a case of Sinc, $a_n = n\pi$.

2. The signal processing circuit according to claim 1, wherein
each of the basic pulses has a frequency component in its corresponding frequency band and has a waveform that has a rate of energy localized in a main lobe section is 85 to 99%.

3. The signal processing circuit according to claim 1, wherein each of the basic pulses is a Sinc waveform, a Chebyshev waveform, or a Taylor waveform.

4. The signal processing circuit according to 1, wherein
the signal processing section performs a clipping process that subtracts, from the original IQ baseband signal, the cancellation signal obtained by multiplying, by a predetermined cancellation pulse, an increment of the IQ baseband signal from a first threshold defining the upper limit of the instantaneous power, to suppress the instantaneous power of the IQ baseband signal to an instantaneous power equivalent to the first threshold.

5. The signal processing circuit according to claim 1, wherein
the signal processing section performs a boosting process that adds, to the original IQ baseband signal, the cancellation signal obtained by multiplying, by a predetermined cancellation pulse, a decrement of the IQ baseband signal from a second threshold defining the lower limit of the instantaneous power, to raise a bottom level of the instantaneous power of the IQ baseband signal to an instantaneous power equivalent to the second threshold.

6. The signal processing circuit according to claim 4, wherein
the signal processing section is capable of performing both of the clipping process and the boosting process.

7. The signal processing circuit according to claim 1, wherein
the pulse generation section generates the cancellation pulse by multiplying the basic pulses determined for the respective frequency bands by relative ratios of average powers for the frequency bands, respectively, and by summing obtained results.

8. The signal processing circuit according to claim 7, wherein
the pulse generation section includes:
a ratio calculation section that calculates the relative ratios for the respective frequency bands;
a waveform storage section that stores the basic pulses for the respective frequency bands; and
a multiplication and addition section that multiplies, by the calculated relative ratios, the corresponding basic pulses, respectively, and sums obtained results.

9. The signal processing circuit according to claim 8, wherein
the signal processing section includes a pulse retention section that retains the cancellation pulse, and
only when the calculated relative ratios fluctuate, the multiplication and addition section performs multiplication and summation using the relative ratios after the fluctuation and outputs a resultant cancellation pulse to the pulse retention section.

10. The signal processing circuit according to claim 8, wherein
the ratio calculation section accumulates square roots of instantaneous powers for the frequency bands, respectively, and when a sum of the accumulated values has become an exponentiation of $2\pm\delta$ ($\delta$ is a sufficiently small predetermined value), the ratio calculation section calculates the relative ratios by dividing the corresponding accumulated values by the exponentiation of 2.

11. The signal processing circuit according to claim 8, wherein
the ratio calculation section performs the calculation of the relative ratios, within a control period in which there is a possibility that an average power of the IQ baseband signal temporally fluctuates.

12. The signal processing circuit according to claim 1, further comprising:
a threshold updating section that updates the thresholds to be used in the signal processing section, for each control period in which there is a possibility that an average power of the IQ baseband signal temporally fluctuates.

13. A communication device comprising:
a transmitter including:
the signal processing circuit according to claim 1; and
a power amplification circuit arranged in a subsequent stage thereof.

* * * * *